US008948515B2

(12) United States Patent
Boiman et al.

(10) Patent No.: US 8,948,515 B2
(45) Date of Patent: Feb. 3, 2015

(54) METHOD AND SYSTEM FOR CLASSIFYING ONE OR MORE IMAGES

(75) Inventors: Oren Boiman, Givat Brener (IL); Alex Rav-Acha, Modi'in (IL)

(73) Assignee: Sightera Technologies Ltd., Nes-Ziona (IL)

( * ) Notice: Subject to any disclaimer, the term of this patent is extended or adjusted under 35 U.S.C. 154(b) by 761 days.

(21) Appl. No.: 13/212,215

(22) Filed: Aug. 18, 2011

(65) Prior Publication Data

US 2012/0039539 A1    Feb. 16, 2012

Related U.S. Application Data

(63) Continuation-in-part of application No. 13/041,457, filed on Mar. 7, 2011.

(60) Provisional application No. 61/311,524, filed on Mar. 8, 2010, provisional application No. 61/374,671, filed on Aug. 18, 2010.

(51) Int. Cl.
| | |
|---|---|
| *G06K 9/00* | (2006.01) |
| *G11B 27/32* | (2006.01) |
| *G11B 27/28* | (2006.01) |
| *G11B 27/34* | (2006.01) |

(52) U.S. Cl.
CPC .............. *G11B 27/28* (2013.01); *G11B 27/329* (2013.01); *G11B 27/34* (2013.01)
USPC .......................................... 382/195; 382/181

(58) Field of Classification Search
None
See application file for complete search history.

(56) References Cited

U.S. PATENT DOCUMENTS

| | | | | |
|---|---|---|---|---|
| 2002/0039446 | A1* | 4/2002 | Santoni | 382/209 |
| 2002/0159630 | A1* | 10/2002 | Buzuloiu et al. | 382/165 |
| 2003/0033347 | A1 | 2/2003 | Bolle et al. | |
| 2004/0208361 | A1* | 10/2004 | Buzuloiu et al. | 382/165 |
| 2005/0105780 | A1* | 5/2005 | Ioffe | 382/118 |
| 2005/0160258 | A1* | 7/2005 | O'Shea et al. | 713/154 |
| 2005/0232480 | A1* | 10/2005 | Swift | 382/165 |
| 2007/0223871 | A1 | 9/2007 | Thelen | |
| 2008/0159624 | A1* | 7/2008 | Sathish et al. | 382/170 |

(Continued)

OTHER PUBLICATIONS

G. Mori, S. Belongie, and J. Malik, "Efficient Shape Matching Using Shape Contexts", Pattern Analysis and Machine Intelligence, IEEE Transactions, vol. 27, Issue 11, Nov. 2005.
Andrew Y. Ng, Michael I. Jordan, and Yair Weiss, "On Spectral Clustering: Analysis and an algorithm", Advances in Neural Information Processing Systems, p. 849-856. MIT Press, 2001.

(Continued)

*Primary Examiner* — Sean Motsinger
(74) *Attorney, Agent, or Firm* — Pearl Cohen Zedek Latzer Baratz LLP

(57) ABSTRACT

A method for determining a predictability of a media entity portion, the method includes: receiving or generating (a) reference media descriptors, and (b) probability estimations of descriptor space representatives given the reference media descriptors; wherein the descriptor space representatives are representative of a set of media entities; and calculating a predictability score of the media entity portion based on at least (a) the probability estimations of the descriptor space representatives given the reference media descriptors, and (b) relationships between the media entity portion descriptors and the descriptor space representatives. A method for processing media streams, the method may include: applying probabilistic non-parametric process on the media stream to locate media portions of interest; and generating metadata indicative of the media portions of interest.

26 Claims, 30 Drawing Sheets

(56) References Cited

U.S. PATENT DOCUMENTS

| | | | |
|---|---|---|---|
| 2010/0205177 A1* | 8/2010 | Sato et al. | 707/737 |
| 2011/0029463 A1 | 2/2011 | Forman et al. | |
| 2011/0103695 A1* | 5/2011 | Sato et al. | 382/190 |
| 2011/0184950 A1 | 7/2011 | Skaff et al. | |
| 2012/0195459 A1* | 8/2012 | Schmidt et al. | 382/103 |
| 2009/0123064 A1* | 5/2009 | Gibbs | 382/165 |
| 2010/0005078 A1 | 1/2010 | Bayliss | |

OTHER PUBLICATIONS

J.R Bergen P. Anandan, K.J. Hanna, and R. Hingorani, "Heirarchical Model-Based Motion Estimation", Second European Conference on Computer Vision, pp. 237-252, David Sarnoff Research Center, Princeton, NJ. 1992.

Office Action for U.S. Appl. No. 13/041,457 mailed Dec. 12, 2012.

Final Office Action for U.S. Appl. No. 13/041,457 mailed Aug. 26, 2013.

* cited by examiner

Determining a predictability of the first media entity given the second media entity based on (a) probability estimations of descriptor space representatives given second media entity descriptors, wherein the descriptor space representatives are representative of a set of media entities and (b) relationships between second media entity descriptors and descriptors of the first media entity. 1410

Determining a predictability of the second media entity given the first media entity based on (a) probability estimations of descriptor space representatives given first media entity descriptors, and (b) the relationships between first media entity descriptors and descriptors of the second media entity. 1420

Evaluating a similarity value between the first media entity and the second media entity based on the predictability of the first media entity given the second media entity and the predictability of the second media entity given the first media entity. 1430

```
┌─────────────────────────────────────────────────────────────────────┐
│  Receiving or generating first media class descriptors and second media class │
│ descriptors; wherein the first media class descriptors represent a first media class of │
│  media entities that comprises a first media feature; wherein the second media class │
│   descriptors represent a second media class of media entities that does not comprise │
│                        the first media feature. 1610                │
└─────────────────────────────────────────────────────────────────────┘
                                    │
┌─────────────────────────────────────────────────────────────────────┐
│   Calculating a predictability score given a first media class based on (a) probability │
│        estimations of descriptor space representatives given the first media class │
│       descriptors, and (b) relationships between the first media class descriptors and │
│                      descriptors of the media entity. 1620          │
└─────────────────────────────────────────────────────────────────────┘
                                    │
┌─────────────────────────────────────────────────────────────────────┐
│     Calculating a second media class predictability score based on (a) probability │
│     estimations of descriptor space representatives given the second media class │
│    descriptors, and (b) relationships between the second media class descriptors and │
│                     descriptors of the media entity. 1630           │
└─────────────────────────────────────────────────────────────────────┘
                                    │
┌─────────────────────────────────────────────────────────────────────┐
│    Determining whether the media entity comprises the feature based on the first │
│    media class predictability score and the second media class predictability score. │
│                                  1640                               │
└─────────────────────────────────────────────────────────────────────┘
                                    │
┌─────────────────────────────────────────────────────────────────────┐
│                  Responding to the determination. 1650.             │
└─────────────────────────────────────────────────────────────────────┘
```

METHOD AND SYSTEM FOR CLASSIFYING ONE OR MORE IMAGES

RELATED APPLICATIONS

This application is a continuation in part of U.S. patent application Ser. No. 13/041,457 filing date Mar. 7, 2011 which in turn claims the priority of US provisional patent filing date Mar. 8, 2010 and Ser. No. 61/311,524. This application claims the priority of U.S. provisional patent Ser. No. 61/374,671 filing date Aug. 18, 2010, all of which are incorporated herein by reference.

BACKGROUND

In recent years, we are all facing an explosion of visual information including images and video. Some of this visual information consists of offending content or other content that is inappropriate to watch by some sectors of the population, such as by children.

The need for content moderation has increased in recent years, since the Internet is now available for everyone, even children at young ages.

Existing solutions are based mostly on textual analysis or internet domain filtering. However, with the emerging of Web 2.0 and User Generated Content sites (such as YouTube, FaceBook, Flickr) the traditional solutions are insufficient. In many cases, the visual information is not accompanied with any textual information. In other cases, misleading textual information is inserted deliberately. This renders textual analysis and domain filtering useless against these threats. Other methods such as crowd sourcing and collaborative filtering are inefficient for the long tail of visual information in user generated content.

Section 2: Related and Previous Work

There has been some work in the field of content moderation and filtering based on visual analysis. Traditional methods use mainly simple image features such as skin information (such as in (1)), or combine skin information with texture and color histograms (See for example (2)).

More recent methods uses a stronger model known as the "Bag-of-features" model, where one creates a dictionary of quantized image descriptors (such as Sift (3)) and then statistical tools such as SVM or PLSA are used to learn a model of porn/non-porn images from the dictionaries (4). Some effort has been put in improving the used image descriptors (e.g. (5)), improving the learning method (e.g. —using PLSA as suggested by (5)) and improving the run-time (e.g. by using image features that can be computed very fast, e.g. amount of edges (6)).

These methods share the model/parametric-based approach.

SUMMARY OF THE INVENTION

A method for classifying at least one image, the method may include: partitioning the at least one image to multiple media entities or receiving a partition information indicative of a partition of the at least one image to multiple media entities; receiving or generating (a) media class descriptors for each media entity class out of a set of media entity classes, and (b) probability estimations of descriptor space representatives given each of the media entity classes; wherein the descriptor space representatives are representative of a set of media entities; calculating, for each pair of media entity and media class, a predictability score based on (a) the probability estimations of the descriptor space representatives given the media class descriptors of the media class, and (b) relationships between descriptors of the media entity and the descriptor space representatives; classifying each media entity of the multiple media entities based on predictability scores of the media entity given each media class; and providing at least one image classification, based on classes of each of the multiple media entities.

The at least one image may include multiple images and wherein the classifying may include classifying each image.

The at least one image may form a video stream.

The at least one image can be a single image.

The method may include applying a human body detection algorithm on the at least one image to provide human body detection results; and partitioning the at least one image based on the human body detection results.

The method may include applying a face detection algorithm on the at least one image to provide face detection results; and partitioning the at least one image based on the face detection results.

The method may include applying a human skin detection algorithm on the at least one image to provide human skin detection results; and partitioning the at least one image based on the human skin detection results.

The method may include determining whether the at least one image should be prevented from being displayed.

The method may include defining a dominant class and classifying an image out of the at least one image as belonging to the dominant class if at least one media entity of the image is classified as belonging to the dominant class.

The method may include executing multiple iterations of a sequence of stages that comprises the stages of receiving or generating, calculating, and classifying; wherein different iterations differ from each other by accuracy of execution and speed of execution.

The decision of whether to apply each iteration may be based on the output of previous iterations.

The method may include filtering out an image based on an outcome of at least one iteration of the multiple iterations.

The method may include detecting a human organ; determining, based on a location of the human organ, an expected location of at least one other human organ; and verifying the expected location of the at least one other human organ by processing at least one portion of an image that corresponds to the expected location of the at least one other human organ.

The method may include executing multiple iterations of a sequence of stages that comprises the stages of receiving or generating, calculating, and classifying; wherein different iterations differ from each other by a complexity level.

At least two iterations may further include partitioning the at least one image.

The method may include performing multiple iterations, each iteration associated with a higher complexity level.

The decision of whether to apply each iteration may be based on the output of previous iterations.

The method may include executing multiple iterations of a sequence of stages that comprises the stages of receiving or generating, calculating, and classifying; wherein different iterations differ from each other by a number of descriptors of the media entities.

At two iterations may include partitioning the at least one image.

The method may include performing multiple iterations while increasing the number of descriptors of the media entities.

The method may include executing multiple iterations of a sequence of stages that comprises the stages of receiving or generating, calculating, and classifying; wherein different iterations differ from each other by a selection of media class descriptors that are taken into account during the iteration.

At least two iterations may include partitioning the at least one image.

The method may include executing multiple iterations of a sequence of stages that comprises the stages of receiving or generating, calculating, and classifying; wherein different iterations differ from each other by descriptors of the media entity that are taken into account during the iteration.

At least two iterations may include partitioning the at least one image.

The method may include applying a motion detection algorithm on the at least one image to provide motion detection results; and partitioning the at least one image based on the motion detection results.

A computer program product that comprises a non-transitory computer readable medium that stores instructions for: partitioning the at least one image to multiple media entities or receiving a partition information indicative of a partition of the at least one image to multiple media entities; receiving or generating (a) media class descriptors for each media entity class out of a set of media entity classes, and (b) probability estimations of descriptor space representatives given each of the media entity classes; wherein the descriptor space representatives are representative of a set of media entities; calculating, for each pair of media entity and media class, a predictability score based on (a) the probability estimations of the descriptor space representatives given the media class descriptors of the media class, and (b) relationships between descriptors of the media entity and the descriptor space representatives; classifying each media entity of the multiple media entities based on predictability scores of the media entity given each media class; and providing at least one image classification, based on classes of each of the multiple media entities.

The at least one image may include multiple images and wherein the classifying may include classifying each image.

The at least one image may form a video stream.

The at least one image can be a single image.

The computer program produce may further store instructions for applying a human body detection algorithm on the at least one image to provide human body detection results; and partitioning the at least one image based on the human body detection results.

The computer program produce may further store instructions for applying a face detection algorithm on the at least one image to provide face detection results; and partitioning the at least one image based on the face detection results.

The computer program produce may further store instructions for applying a human skin detection algorithm on the at least one image to provide human skin detection results; and partitioning the at least one image based on the human skin detection results.

The computer program produce may further store instructions for determining whether the at least one image should be prevented from being displayed.

The computer program produce may further store instructions for defining a dominant class and classifying an image out of the at least one image as belonging to the dominant class if at least one media entity of the image is classified as belonging to the dominant class.

The computer program produce may further store instructions for executing multiple iterations of a sequence of stages that comprises the stages of receiving or generating, calculating, and classifying; wherein different iterations differ from each other by accuracy of execution and speed of execution.

The decision of whether to apply each iteration may be based on the output of previous iterations.

The computer program produce may further store instructions for filtering out an image based on an outcome of at least one iteration of the multiple iterations.

The computer program produce may further store instructions for detecting a human organ; determining, based on a location of the human organ, an expected location of at least one other human organ; and verifying the expected location of the at least one other human organ by processing at least one portion of an image that corresponds to the expected location of the at least one other human organ.

The computer program produce may further store instructions for executing multiple iterations of a sequence of stages that comprises the stages of receiving or generating, calculating, and classifying; wherein different iterations differ from each other by a complexity level.

At least two iterations may further include partitioning the at least one image.

The computer program produce may further store instructions for performing multiple iterations, each iteration associated with a higher complexity level.

The decision of whether to apply each iteration may be based on the output of previous iterations.

The computer program produce may further store instructions for executing multiple iterations of a sequence of stages that comprises the stages of receiving or generating, calculating, and classifying; wherein different iterations differ from each other by a number of descriptors of the media entities.

At two iterations may include partitioning the at least one image.

The computer program produce may further store instructions for performing multiple iterations while increasing the number of descriptors of the media entities.

The computer program produce may further store instructions for executing multiple iterations of a sequence of stages that comprises the stages of receiving or generating, calculating, and classifying; wherein different iterations differ from each other by a selection of media class descriptors that are taken into account during the iteration.

At least two iterations may include partitioning the at least one image.

The computer program produce may further store instructions for executing multiple iterations of a sequence of stages that comprises the stages of receiving or generating, calculating, and classifying; wherein different iterations differ from each other by descriptors of the media entity that are taken into account during the iteration.

At least two iterations may include partitioning the at least one image.

The computer program produce may further store instructions for applying a motion detection algorithm on the at least one image to provide motion detection results; and partitioning the at least one image based on the motion detection results.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 13-17 illustrate methods according to an embodiment of the invention;

Figure 1:
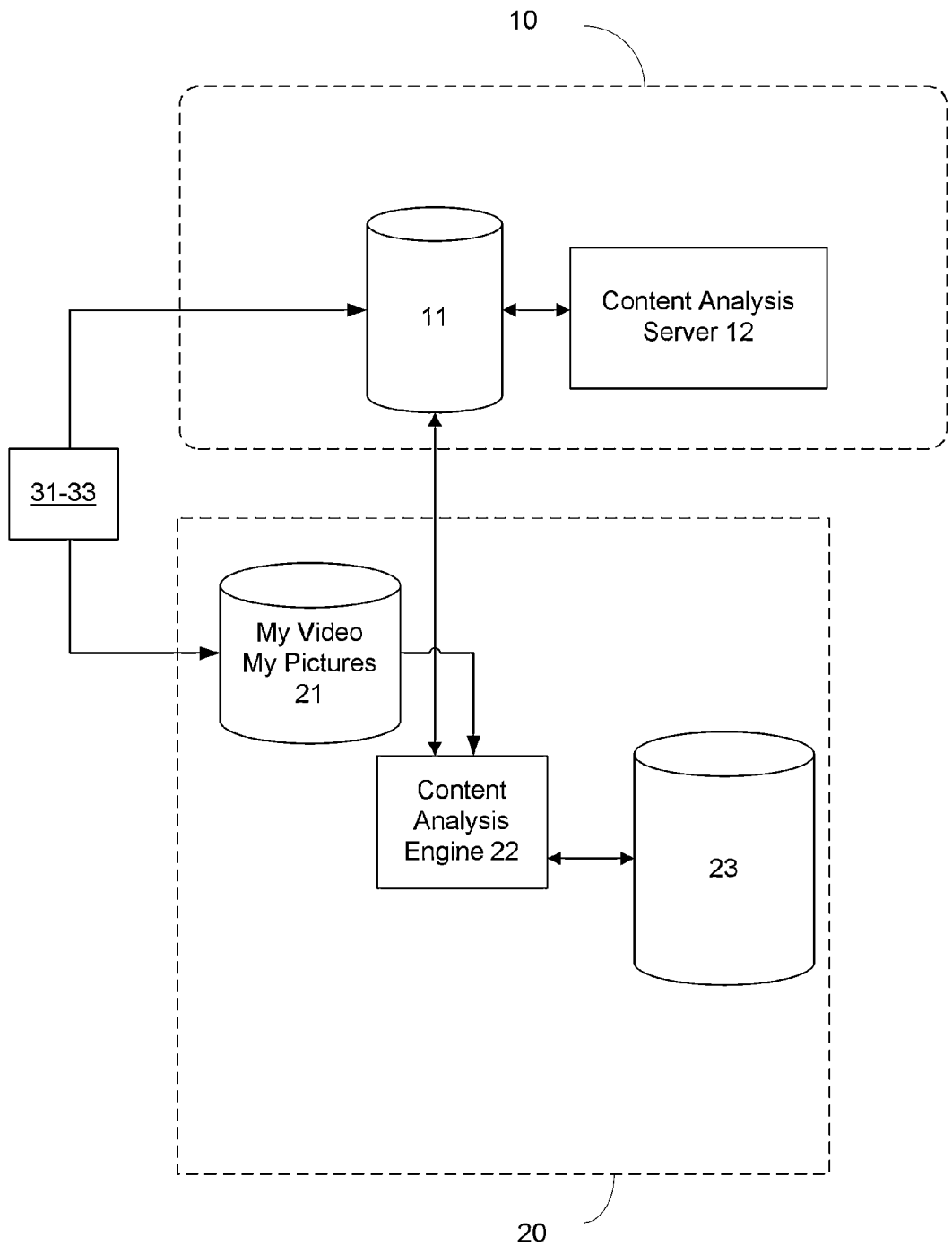
FIG. 1 illustrates a system according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The illustrated methods, systems and computer program products may provide a comprehensive solution to the problems of browsing, searching editing and producing personal video, by utilizing automatic image and video content analysis. In contrast to previous related art, the methods, systems and computer program products may identify all the required aspects of the problem and thereby provides a complete solution.

The term media entity refers to information representative of visual information, information representative of audio information or a combination thereof. Non-limiting examples of a media entity may include an image, a video stream, an access unit, multiple images, a portion of an image, a portion of a video stream, a transport packet, a elementary stream, a packetized elementary stream, an audio stream, an audio frame, any combination of audio representative information.

Any reference to a method should be interpreted as a reference to a system and additionally or alternatively as a reference to a computer program product. Thus, when describing a method is it noted that the method can be executed by a system or by a computer that executes instructions of the computer program product.

Any reference to a system should be interpreted as a reference to a method executed by the system and additionally or alternatively as a reference to a computer program product. Thus, when describing a system is it noted that the system can execute a method or can execute instructions of the computer program product.

Any reference to a block can include a reference to a hardware block, a software block or a stage of a method. Thus, for example, any of the blocks illustrated in FIG. 4-9 can be regarded as method stages.

The methods, systems and computer program products may provide a unified and generic approach—the media predictability framework—for handling the numerous capabilities required for a comprehensive solution.

Thus, instead of multiple ad hoc modules and partial solutions, the methods, systems and computer program products may provide provides a single coherent approach to tackle the entire problem.

The methods, systems and computer program products can be applied in diverse technological environments.

Methods, systems and computer program products may provide a comprehensive solution for using personal video as they enables browsing, searching editing and production of personal video.

The methods, systems and computer program products may rely on a unified automated media content analysis method, instead of relying on numerous methods for implementing the long list of features required for 'media understanding'. The proposed method relies on a unified content analysis platform that is based on the Media Predictability Framework (discussed in the next section), which forms the technological foundation of the product.

In this section we discuss the various type of meta-data (and their use) obtained using analysis with the media predictability framework.

The processing of media entities may involve running software components on various hardware components and the processing of data files in several internet locations. We use the following entities in the text below:

User Computer: A computer with general computing capabilities such as Desktop, Laptop, Tablet, Media Center, Smartphone.

Personal Media: Images and Video of any common format (e.g., For images: Jpeg, Tiff, Gif, Jpeg2000 etc. For Video: Avi, wmv, mpeg-4, QuickTime etc.)

Private Data and Meta-Data Database: Binary and Textual data and meta-data kept in tables and files either as a flat database organization or as a relational database (e.g., MySql).

Interaction Server: An online server (either dedicated or in a computing cloud) which handles at least one of: uploading of user media, streaming, recording usage and viewing analytics, handling user and visitor interaction and registration, handling online payment, storage of online data and meta-data, selecting ads per viewed video and per user/visitor.

Content Analysis Server: A server which performs content analysis for uploaded user media (user video including audio, user images, user selected soundtrack)

Production Server: A server, which utilizes the original footage and the analyzed meta-data to create various personalized and stylized video productions. This server may utilize professional video creative software such as Adobe After Effects, Sony Vegas etc. to render the video production (e.g., video effects and transitions).

Online Data and Meta-Data Database: An online database, which contains Binary and Textual data and meta-data kept in tables and files either as a flat database organization or as a relational database (e.g., MySql).

User Interface Application: A standalone application or web application (runs inside a web browser) or a software widget or software gadget which enables the user to (at least one of) play, view, browse, search, produce, upload, broadcast and share his personal media.

Mobile Application: An application designed for a mobile device (e.g., Cellular application, iPad application etc.). This application is a specialized user interface application for the respective mobile device.

Local Player—A mini-version of the User Interface Application with reduced capabilities, which runs locally on the user/visitor computing device using a playing platform (e.g., Flash, Silverlight, HTML5).

Electronic Media Capturing Device—An electronic device which can capture personal image and/or video such as: Camcorder, Still Camera, Camera-phone, Internet Camera, Network Camera, Camera embedded in User Computer (e.g., Laptop) etc.

'My Video; My Pictures' any set of file directories or libraries which reside on the user computer (e.g, on a Hard drive, or any electro-magnetic or optical media such as DVD, CD, Blue-Ray disk, Flash-Memory etc.) or on the user online folders (e.g., DropBox) and which stores the user personal media or shared media.

FIG. 1 illustrates a interaction server 10, a user computer 20 and image acquisition devices 31-33 according to an embodiment of the invention.

The user provides acquired media from image acquisition devices such as camcorder 31, camera-phones 32, digital still camera 33 etc. The media can be stored in a private database 21 of the user computer 20 and/or be loaded to the interaction server 10.

If the user stores the media on the user computer 20, the content analysis engine 22 of the user computer 20 analyzes the media using database accesses to a database 23 of the user computer 20. The data base 23 can store private data and private meta-data of the user. Another database 11 (also referred to as on-line database) can store data and meta-data shared by multiple users. The other database 11 and a content analysis server 12 belong to the interaction server 10.

The analysis results of the content analysis engine 22 or of the content analysis server 12 can be stored in either one of the databases 11 and 23—based on, at least, a selection of a user The user can directly upload media to the interaction server 10. In this case, the media is stored on the online database 11 and be analyzed by the content analysis server 12. The resulting data and meta-data can be stored on the Online database 11. Another option for the user is to use a combination of the approaches above: Uploading to the Interaction server, downloading and synchronizing to the user computer and processing in the Content Analysis Engine.

Figure 2:
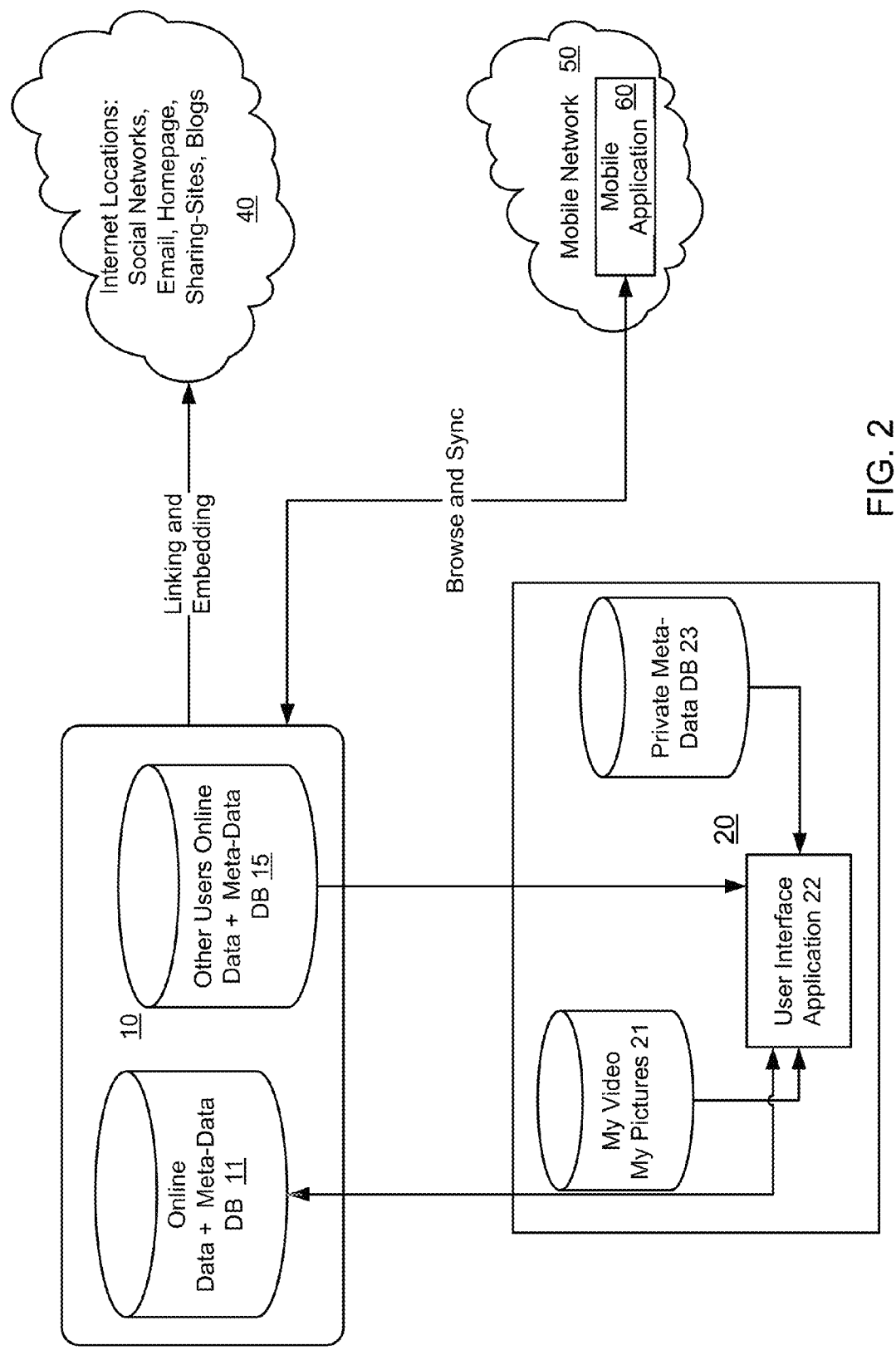
FIG. 2 illustrates a system and its environment according to an embodiment of the invention.

FIG. 2 illustrates an interaction between a interaction server 10, the user computer 20, a mobile network 50 and the Internet 60 according to an embodiment of the invention.

The user can interact using a User Interface (UI) Application which might be a standalone application or a web application in a web browser. Using this UI the user can search, browse, produce and broadcast his personal media (stored on the user computer 30). The UI may get input from the original user media (e.g., on 'My Video/My Pictures or other user media locations) with the extracted data and meta-data from the private and online databases 11, 15, 21 and 23. For instance, even if the user computer 20 has no private database, the user can still search and browse the online databases 11 and 13 using the UI. Using the Mobile Application UI 60 the user can search and browse the data on the interaction server 10 (according to his user privacy settings) from mobile platform (e.g., Cellular phones, iPad). Users as well as Visitors can view, browse and search media on the Interaction server using the 'Local Player' (e.g., Flash Player embedded in HTML pages) which can be embedded in other web content.

Browsing

Browsing enables users to quickly find interesting information, when the users cannot easily describe what they are seeking. For this mode of associative discovery, it should be easy to understand the content of a video and to quickly navigate inside video and between semantically related video clips.

In order to support browsing the invention enables automatically generation of a table of content, of intelligent preview and thumbnails, of links to "similar" video, content based fast-forwarding and spatial video browsing.

Table of content may be a table-of-visual content (optionally hierarchical), which segments a video (or any other set of visual entities) to scenes with similar visual content. Note that these scenes usually cannot be separated by detecting different shots and they might overlap in time (e.g., the cameraman zooms in on a first context then moves on to a second context, then returns to the first context).

Intelligent preview and thumbnails may include a very short (e.g., 5-10 seconds long) summary of the most representative portions of the video. This condensed summary enables the user to get a quick impression of the content in the video. It could comprise frames (storyboard), short clips or a combination of both. Such short representation can be even used as an intelligent thumbnail that plays the video preview when the user selects it (e.g., mouse hovers over thumbnail).

Link to "similar" video—may include a list of related video and images, where relatedness is determined according to direct visual similarity as well as semantic similarity of the visual content: similar persons, similar objects, similar place, similar event, similar scene, similar time. The link can either point to an entire clip or to a time frame in it. Such links enable associative browsing when the user in not seeking a specific content.

Content-based fast forward. Viewing personal video may become a boring task very quickly, as real-life activity tends to repeat itself. Content-based fast-forward enables the user to fast forward to the next novel activity (with different actions, behavior, etc'). This capability is executed either by adapting the speedup to the (automatically determined) degree of interest or by jumping to the next interesting segment in the video.

Spatial Video Browsing. In many video shots, the camera wanders around while scanning the area of interest. Spatial Browsing enables the user to freeze time and simulate spatial browsing with the camera. Namely, in response to a request from the user to move the camera (via keyboard, mouse or touch screen) the viewed image will change to an image with the proper camera point of view.

Searching

The Search engine enables the users to quickly retrieve information according to a given criterion. Searching can be done using a visual or textual query. In order to enable searching the method enables deep, frame-based indexing, automatic tagging and keywords and criterion based search.

Deep, frame-based indexing—The method creates an index of objects, actions, faces, facial expressions, type of sound, places and people. Objects includes among many possible options pets, cars, computers, cellular phones, books, paintings, TV, tables, chairs etc. The indexing includes the extraction of new entities, comparing them to known entities (e.g., a known face) and keeping an index item for them. The index can be associated with a frame, a video segment or with the entire video clip.

Automatic Tagging and Keywords—The method clusters repeating entities (e.g., a repeating face) and generates a tag from it. A tag has a visual representation (e.g., image of a face) and a textual tag (e.g., name of a person). The user can name a visual tag. Each frame has a list of tags and each video has a list of the most important (frequent) tags. The user can add his own tags to the automatically generated tags. When a tag has a semantic meaning (e.g., 'dog' as opposed to 'Rexy') the method relates the semantic meaning of the tag to other synonym keywords enabling easier textual search.

Criterion based Search—The user can search by a query combining free text, visual and textual tags. The method finds the video or the images that are most relevant to the query. For instance, the user can select a picture of a person's face, select the textual tag 'living-room' and add free text 'birthday party' (which is used as a keyword).

Automatic Editing and Production—In order to support sharing and broadcasting of personal video the raw video should be edited and produced automatically (or with minimal user interaction). The method may enable at least one of the following: (a) Automatic Editing of Video and Images; (b) Semi-Automatic Editing of Video and Images; (c) Automatic Video production of selected clips; (d) Automatic Interpretation of user directives; (e) Manual Post Production; (f) Personalized Production; (g) Professional Production; (h) Automatic Movie "Trailer"; (i) Automatic Content Suggestions; (j) Automatic News and Updates; (k) Automatic Group and Event Suggestions; (l) Graphics-Video interaction; (m) Return to original video; (n) Uploading and Broadcasting: and (o) Documentary web-pages.

Automatic Editing of Video and Images—The method automatically selects and edits clips and images from raw video and images input, in order to create a shorter video summary. The automatic editing relies on various factors for choosing the most important parts: Faces, known persons/objects, camera motion/zoom, video and image quality, action saliency, photo-artistic quality, type of voice/sound, facial expression (e.g., smile).

As a part of the editing process, the image quality is improved using de-noising, video stabilization and super-resolution. The automatic editing can change the speed of a video (e.g., slow motion/fast motion) or even convert a video clip to an image if, for instance, the clip is too short. Another case for converting video clip to image, is when the camera pans and the automatic editing decides to create a mosaic image from the clip.

The user can select a sound track to add to the edited video. Prior meta-data and analysis on the audio track might affect the automatic editing decisions (e.g., fast pace, short clips for high tempo audio track). The automatic editing is generating the selected clips (and images) to fit a video length specified by the user (e.g., 45 seconds).

Semi-Automatic Editing of Video and Images—The user can modify the resulting automatic editing by the following operations:

Removing an unwanted clip

Adding a suggested clip (from an automatically prepared candidate list)

Selecting one of more faces to be emphasized or excluded from the edited video. This lists of faces is automatically extracted from the video and can be displayed to the user using a graphical user interface similar to the figure below.

Other types of object or tagged entities can be similarly removed or emphasized (e.g. emphasizing a certain location).

Figure 11:
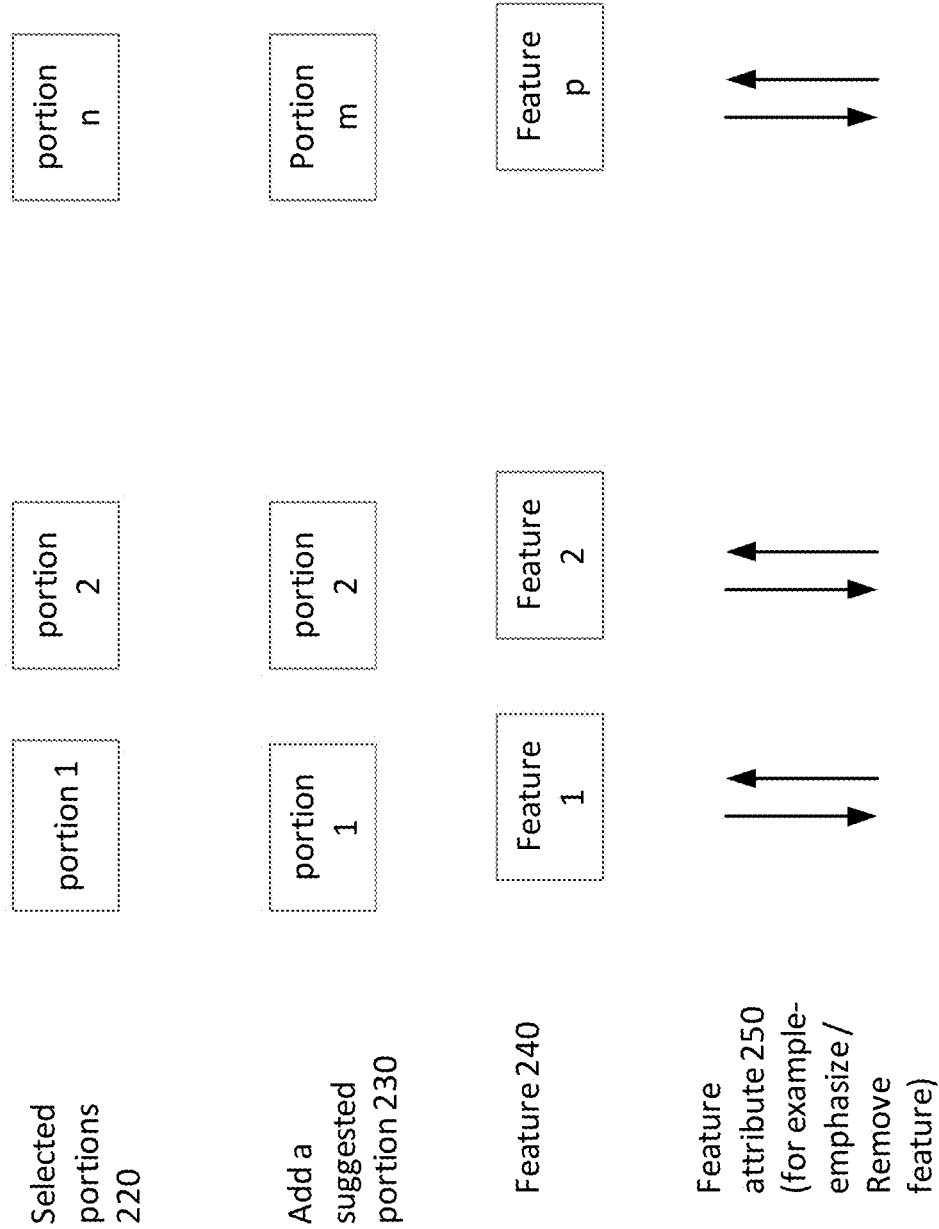
FIG. 11 illustrates an editing process according to an embodiment of the invention.

FIG. 11 illustrates a process of editing a video entity.

Symbols representing media entity portions of interest 220, media entity portions that may be of interest 230 (but may have a lower importance level), features 240 (such as faces of persons) and feature attributes 250 can be displayed to the user. The user can select which media entity portions to include in an edited media entity and can, additionally or alternatively, indicate an attribute such as an importance level of features. An attribute can reflect a preference of a user—for example—whether the feature is important or not, a level of importance of the feature, or any other attribute that may affect an editing that is responsive to the attribute.

According to an embodiment of the invention an editing process can include one or more iterations. The user can be presented with media entity portions of interest, features, and even an edited media entity and receive feedback from the user (whether to alter the edited media entity, which features are more important or less important, adding media entity portions of interest, defining a level of interest that should allow an media entity of interest to be considered as a candidate to be included in an edited media entity, and the like.

These inputs are provided to any of the mentioned above blocks or system that may edit the edited media entity in response. The importance level provided by the user is taken into account during the editing—as images that may include features that were requested by the user will me more likely be included in the edited media entity.

Automatic Video production of selected clips—The selected clips and images can be used in a straightforward manner to create a video clip summary. However, the method can also provide a much more compelling automatically produced video clip. The automatic production makes use of a library of effects, transitions, graphic assets and sound tracks, which are determined according to the video and the extracted meta-data. For instance, an algorithm can choose to use a face-morphing transition effect between two clips, where the first clip ends in a face and the second clip starts in a different face. Another example is to use an effect where the frame is moving in the direction of the camera motion.

Automatic Interpretation of user directives—The user can act as a director during the filming of the video and perform various predefined gestures, in order to guide the later automatic editing and production stage. For instance, a user can indicate that he would like to create a mosaic by passing a finger from one side of the camera to the other and then panning slowly. Another example is that a user signals that he has just captured an important clip that should pop up in any editing by a special gesture (e.g. making 'V' with the fingers).

In this manner, the system can identify user gestures and enables the user to act as the director of the automatic summarization in vivo.

Manual Post Production—The user can watch the resulting production and can intervene to override automatic decision. For instance, the user can remove or add clips from a candidate list of clips using a simple checkbox interface. In addition, the user can change the starting point and end point of each selected clip. Moreover, user can change the transitions if he likes, in a post production stage.

Personalized Production—besides manual post editing, the user can affect the automatic production and editing stages using a search query, which emphasizes the parts in the video, which are important to the user. The query can take the form of a full search query (text+tags+keywords). For instance, a query of the form 'Danny jumping in the living room' would put more emphasize in the editing and the production stages on parts which fit the query. Another example is of a query which uses a visual tag describing a pet dog and a location tag with an image of the back yard. Another option for the user to affect the editing stage is by directly marking a sub-clip in the video which must appear in the production. Yet another example is that the user marks several people (resulting from Face Clustering and Recognition) and gets several productions, each production with the selected person highlighted in the resulting clip, suitable for sharing with that respective person.

Professional Production—The method allows an additional, professional human editing and production. The method delivers the raw video, the extracted meta-data and the automatically produced video to professional producers (via internet or via a delivery service using DVDs etc.). After the professional editing, the user receives a final product (e.g., produced DVD) via mail or delivery. Such a professional production can complement the automatic production when professional quality is needed (e.g., for souvenirs, presents). Alternatively, the method can export the automatic editing and the respective meta-data to common video editing formats (e.g., Adobe Premiere, Apple Final Cut).

Automatic Movie "Trailer"—The method described above for editing and production of video can be used to create an automatic movie trailer for every video in the user library. This is a produced version of the video preview, which can be served as the default version for sharing a single video. This "Trailer" can also be used as a short version for various kinds of user generated content (even if not personal), for instance for automatic "Trailers" of popular YouTube videos for users who prefer to view the highlight before viewing the entire video.

Automatic Content Suggestions—The method automatically suggests to the user edited video clips which are suitable for sharing. For instance, after the video from a recent trip was loaded to the user computer, the method automatically produces the relevant data and suggests it to the user, who can decide to share the suggestion by a simple approval of the suggestion.

Automatic News and Updates—The method uses the extracted meta-data to automatically find shared video and images which might interest the user. For instance, the method can suggest to the user to view a video in one of his friend's shared content in which he participates. In this manner, a user can be informed of visual information, which may be of interest to him, even if he did not upload the video by himself.

Automatic Group and Event Suggestions—The method uses the extracted meta-data and discovered similarities between user data and shared data to propose formation of groups of people (e.g., close family, trip friends) and event suggestions (e.g., trip, party, birthday). In this manner, shared media entities, which can be clustered with other media, can be grouped in a semi-automatic manner (with user approval). In addition, the method can suggest producing personalized summaries of events—for instance, generating a different summary for each chosen participant in which this participant is highlighted in the generated synopsis. Such personalized summaries can encourage event and group participants to add their own media from the event, remix the results and so on. This can promote the building a large media pool of an event or a group.

Graphics-Video interaction—The method enables to add a layer of graphic-video interaction, based on the extracted meta-data. For instance, a conversation bubble can track a person's head or face. Another example is of a graphic sprite interacting with the video (e.g., a fly added as a graphic layer to the video and which avoids a person as he moves in the clip). This added layer can be disabled by the user.

Return to original video—The method enables the user to return to the original video clip from any point in the produced video by double-clicking (or tapping in touch screen) the display in that point.

Uploading and Broadcasting—The method enables the user to upload the produced video and related meta-data to a video storage site, which enables to embed the video to be streamed via a video player (e.g., Flash Player) in various internet locations including: email, social networks, blog sites, home pages, content management systems, image and video sharing sites.

Documentary web-pages—The method enables the user to create documentary web pages, which are dedicated for a certain entity such as event, person, group and object. For example, creating a web page of a child, where video clips and images of the child are kept, documenting the child at different stages of his life. Another example is a page documenting a party where all participating users are invited to view current productions, upload their footage of the party, invite further participants and use all uploaded footage to create new productions (and so on). A different example is a web page documenting a user's trips in the world. Yet another important example is a memorial page dedicated to the memory of a deceased person. The system can automatically detect new videos or images that are relevant to the documentary page, and add them to the page via approval of the user. This web page can be organized as an album or as a storyboard, and can be accompanied with annotations and text that was inserted automatically (using the meta-data) or by the user.

Figure 3:
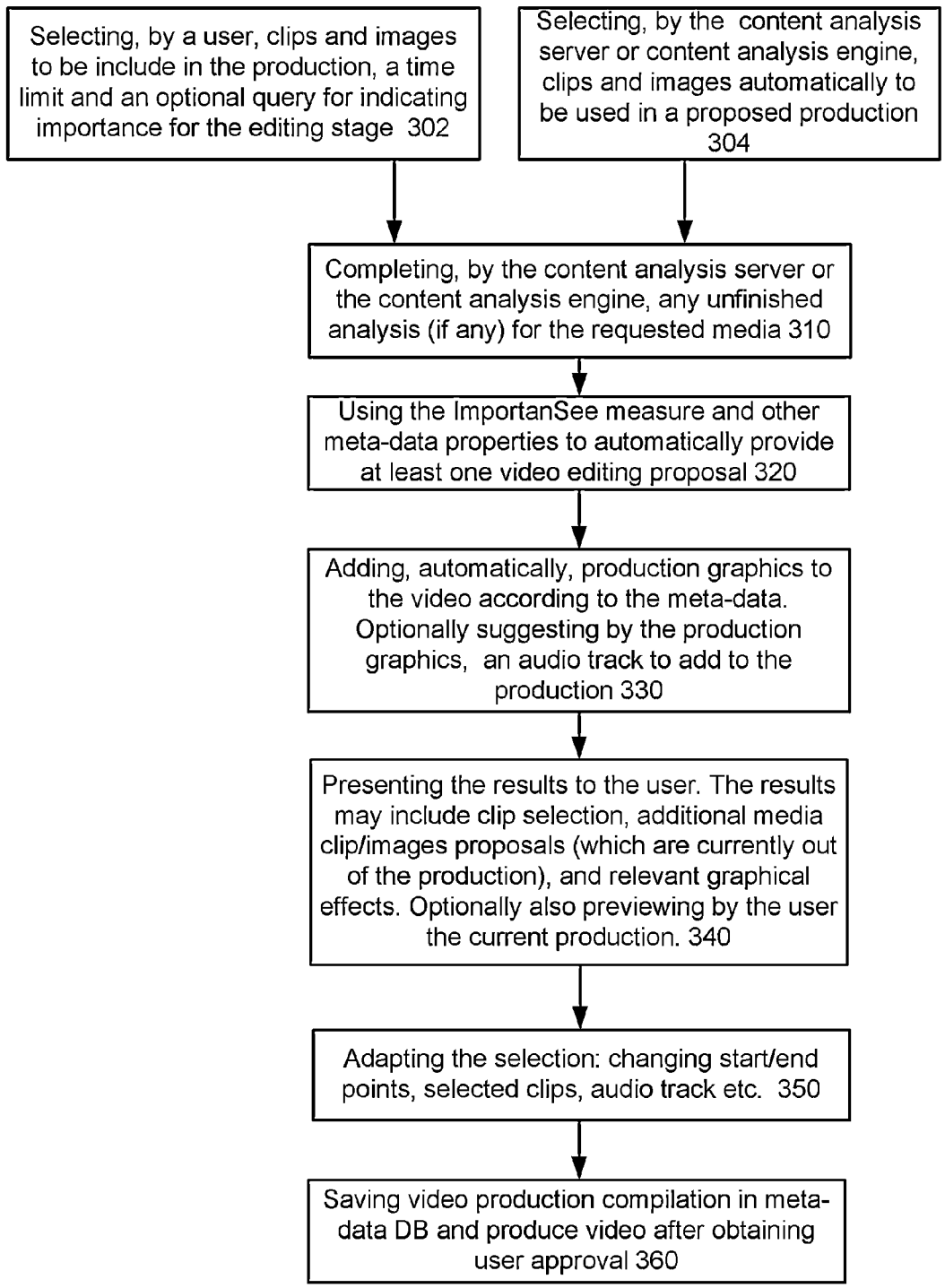
FIG. 3 illustrates a method according to an embodiment of the invention.

FIG. 3 illustrates a method 300 according to an embodiment of the invention.

Method 300 may start by stage 302 or 304. These stages are followed by a sequence of stages 310, 320, 330, 340, 350 and 360.

Stage 302 includes selecting, by a user, clips and images to be included in the production, a time limit and an optional query for indicating importance for the editing stage.

Stage 304 includes selecting, by the content analysis server or content analysis engine, clips and images automatically to be used in a proposed production Stage 310 includes completing, by the content analysis server or the content analysis engine, any unfinished analysis (if any) for the requested media Stage 320 includes using the ImportanSee measure and other meta-data properties to automatically provide at least one video editing proposal Stage 330 includes adding, automatically, production graphics to the video according to the meta-data. Optionally suggesting by the production graphics, an audio track to add to the production Stage 340 includes presenting the results to the user. The results may include clip selection, additional media clip/images proposals (which are currently out of the production), and relevant graphical effects. Optionally also previewing by the user the current production.

Stage 350 includes adapting the selection: changing start/end points, selected clips, audio track etc.

Stage 360 includes saving video production compilation in meta-data DB and produce video after obtaining user approval.

The Media Predictability Framework

The long list of features above is very difficult to implement in an ad hoc manner. Instead, the proposed method relies on a unified media content analysis platform, which we denote as the media predictability framework. In this framework, we measure to what extent a query media (visual or audio) entity is predictable from other reference media entities and use it to derive meta-data on this query entity: For instance, if a query media is un-predictable given the reference media, we might say that this media entity is interesting or surprising. We can utilize this measurement, for example, to detect interesting parts in a movie by seeking for video segments that are unpredictable in this manner from the rest of the video. In addition, we can use the media predictability framework to associate between related media entities. For example, we can associate a photo of a face with a specific person if this photo is highly predictable from other photos of that person.

In the sections below we first describe the theoretical foundations of the media predictability framework, then detail the implementation of the media analysis building blocks using this framework. Lastly, we describe how to implement the diverse features above, providing a comprehensive solution for personal video using the media analysis building blocks.

A Non Parametric approach for determining Media Predictability

The predictability framework is a non-parametric probabilistic approach for media analysis, which is used by our method as a unified framework for all the basic building blocks that require high-level media analysis: Recognition, Clustering, Classification, SalienSee Detection, etc'. We will first describe in detail the predictability framework and then show how to derive from it the different building blocks.

Generally speaking, the predictability measure is defined as follows: Given a query media entity d and a reference media entity C (e.g. —portions of images, videos or audio) we say that d is predictable from C if the likelihood $P(d|C)$ is high, and un-predictable if it is low. In this section we describe how to actually compute this predictability score in a unified manner, regardless of the application.

Descriptor Extraction

In this subsection we describe how to extract descriptors for a media entity.

A specific case of media descriptors is image descriptors. Each image descriptor describes a patch or region of interest or arbitrarily shaped region in the image (this can also be the entire image). One of the most informative image descriptors is the Daisy descriptor (Fua 2008) which computes a gradient image, and then, for each sample point, produces a log-polar sampling (of size 200) of the gradient image around this point (a detailed description is given in (Fua 2008)). Video descriptors describe space-time regions (e.g. x-y-t cube in a video). Examples of video descriptors include, raw space-time patches or concatenating Daisy descriptors applied on several consecutive frames (e.g. —3 frames, yielding a descriptor of length 200×3=600 around each sample point). However, there are many types of descriptors, known in the literature, that capture different aspects of the media, such as—simple image patches, shape descriptors (See for example (G. Mori, S. Belongie, and J. Malik 2005)), color descriptors, motion descriptors, etc. Information from different types of descriptors can be fused to produce better predictability estimation.

Similar to visual descriptors, audio can also be analyzed using audio descriptors. Some audio descriptors that are popular in the literature are MFCC, PLP, or the short-time spectrum. Audio descriptors can be specialized for speech representation, music representation, or general sound analysis. These descriptors can be computed, for example, using open source tools such as the CMU sphinx (http://cmusphinx.sourceforge.net/). Although each media has its own very different descriptor type, our predictability framework is applicable to all descriptor and media types.

Figure 4:
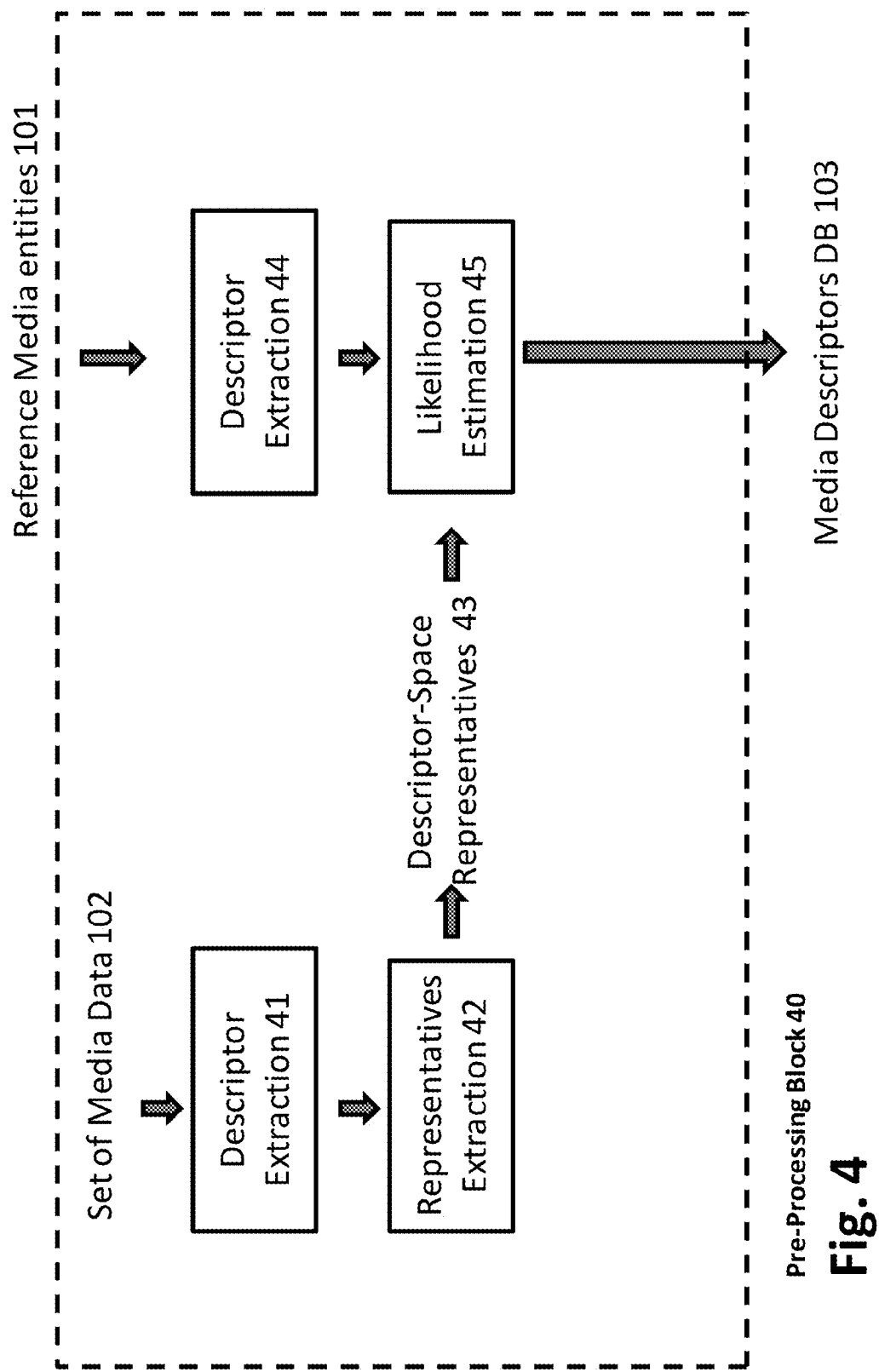
FIG. 4 illustrates a pre-processing block according to an embodiment of the invention.

FIG. 4 illustrates a pre-processing block 40 according to an embodiment of the invention.

The pre-processing block 40 receives reference media entities 101 and a set of media data and outputs reference media descriptors 103 that can be stored in a media descriptors database.

The pre-processing block 40 processes the reference media entities 101 by a descriptor extractor 44 to provide a descriptor set of the reference media entities. The pro-processing block 40 generates (by description extractor 41 and representative extractor 42) a descriptor space representatives of the set of media data 102. The descriptor set of the reference media entities and the descriptor space representative are fed to a likelihood estimator 45 that outputs the reference media descriptors 103.

Descriptor Extraction: Given a reference set of media entities C, we first compute a set of descriptors over a set of sampling points. The sampling points can be a uniform dense sampling of the media (for example, a grid in an image) or only at points of interest (e.g. —corners in image). Let $\{f_1^c, \ldots, f_K^c\}$ denote the set of descriptors computed for the media reference C.

Descriptor-Space Representatives: Given a set of media entities (can be the reference media itself), the descriptors for these entities are extracted. Next, the representative set is extracted from the full descriptor set in the following manner. A random sampling of the descriptor can be used to generate representative, but vector-quantization might also be used (for example—using mean-shift or k-means quantization, etc').

Density Estimation: Given both the descriptor-space representatives $\{q_1, \ldots, q_L\}$, and the descriptor set extracted from the reference $C-\{f_1^c, \ldots, f_K^c\}$, the next step is likelihood estimation. $\{f_1^c, \ldots, f_K^c\}$ is an empirical sampling from the underlying probability distribution of the reference. In this step, we estimate the log likelihood $\log P(q_i)$ of each representative $q_i$ in this empirical distribution. Several non-parametric probability density estimation methods exist in the literature. The Parzen estimation of the likelihood is given by:

$$\hat{p}(q_i | f_1^C, \ldots, f_K^C) = \frac{1}{k} \sum_{j=1}^{K} K(q_i, f_j^C)$$

where K(.) is the Parzen kernel function (which is a non-negative operator and integrates to 1;

A common kernel is the Gaussian kernel: $(q_i, f_j^C) = \exp(s\|q_i - f_j^C\|^2))$ with s representing a fixed kernel width. The set of descriptor-representatives $\{q_1, \ldots, q_L\}$ together with their corresponding likelihoods $\{P(q_1), \ldots, P(q_L)\}$ and the original descriptors $\{f_1^c, \ldots, f_K^c\}$ are used to construct the Media Descriptors Data-base, which is used in the query block.

Figure 5:
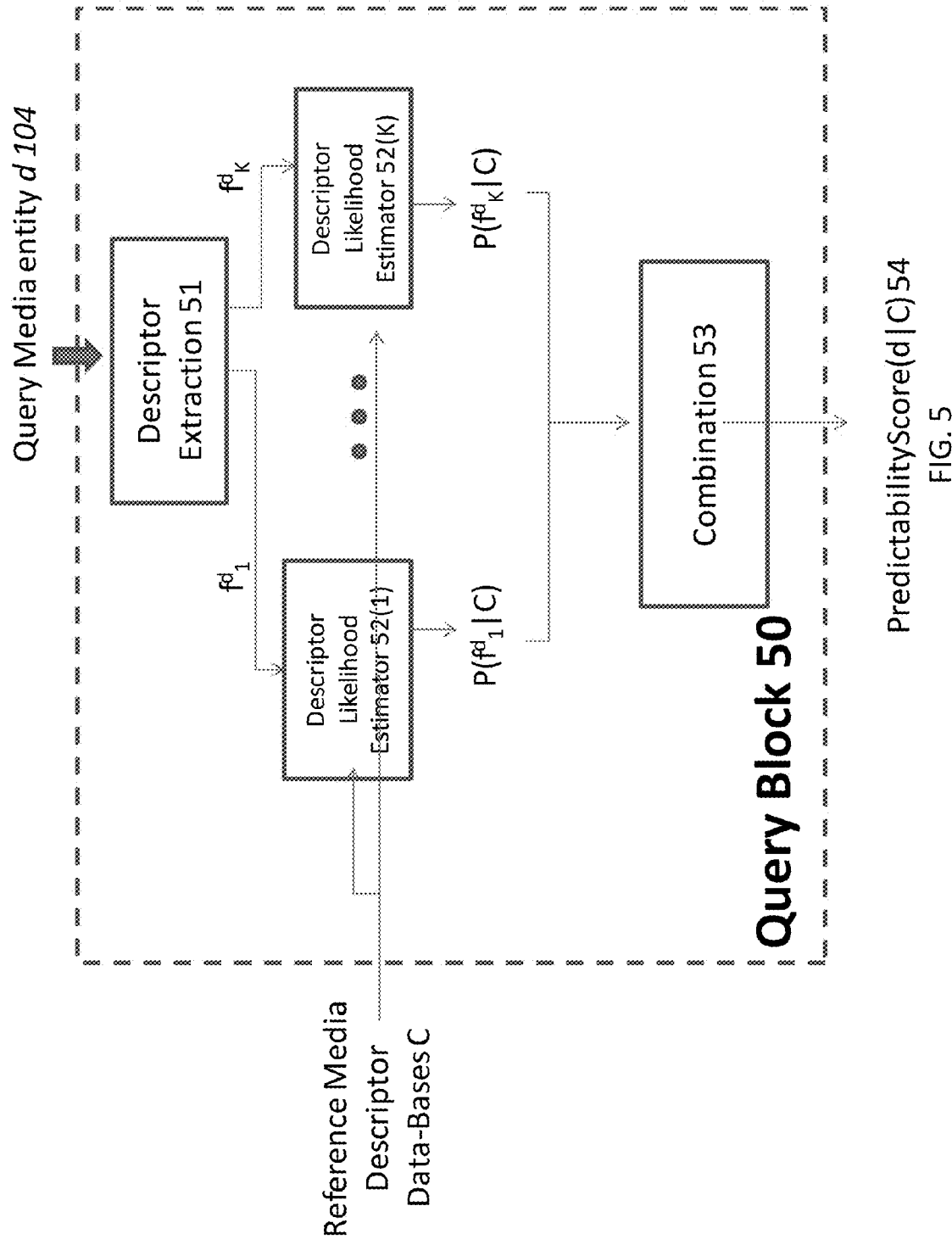
FIG. 5 illustrates a query block according to an embodiment of the invention.

FIG. 5 illustrates a query block 50 according to an embodiment of the invention.

The query block 50 receives a query media entity (d) 104, reference media descriptors from reference descriptor database and outputs a predictability score P(d|C) 54. The query block 50 includes a description extractor 51, a set (1 to K) of descriptor likelihood estimators 52(1)-52(k) and a combination unit 53.

Descriptor Extraction 51: Given a query media entity d, we first compute a set of descriptors $\{f_1^d, \ldots, f_N^d\}$ over a set of sampling points (similar to the descriptor extraction step of the pre-processing block).

In addition, each descriptor is attached with a weight $m_i$ of its sample point, which can be user defined. Commonly, we use uniform weights, but other weighting schemes can be used: for example, giving a larger weight to a region of interest (e.g. a ROI in an image which gives a weight of 1 to all descriptors inside the ROI, and zero outside).

Media likelihood Estimation 52(1)-52(K): For each descriptor $f_i^d$, the log-likelihood log $P(f_i^d|C)$ is estimated, where C is the reference media. The log-likelihood of each descriptor can be estimated in the following way:

$$\log P(f_i^d|C) = w_1 \log P(q_1) + \ldots + w_L \log P(q_L), (\Sigma w_k = 1)$$

Where $P(q_k)$ are pre-computed values extracted from the reference media descriptor database, $w_k$ are interpolation weights which are determined as a function of the distance of $f_i^d$ from $q_k$. The simplest weighting scheme is linear, by setting $w_k \propto \|f_i^d - q_k\|^{-1}$. This estimation can be approximated by taking only the first few nearest neighbors representatives, and setting $w_k$ to zero for the rest of the representatives.

More generally, the log-likelihood log $P(f_i^d|C)$ can be estimated using a non-linear function of the representative log-likelihood values and the distances from them:

$$\log P(f_i^d|C) = F(\{\log P(q_1), \log P(q_L), \|f_i^d - q_1\|, \ldots, \|f_i^d - q_L\|\})$$

Combination: All the likelihoods of the different descriptors are combined to a predictability score of the entire query media entity d. The simplest combination is a weighed sum of the log-likelihood estimations:

$$\text{PredictabilityScore}(d\|C) = \Sigma m_i \cdot \log P(f_i^d\|C).$$

Where $m_i$ are the sample point weights mentioned above. If we have multiple types of descriptors (referred below as aspects), $\{f_{11}^d, \ldots, f_{N1}^d\}, \ldots, \{f_{1R}^d, \ldots, f_{NR}^d\}$ (I.e. —R different descriptor types or R aspects), the combined score becomes:

$$\text{PredictabilityScore}(d|C) = \Sigma_{r=1}^R \alpha_r \Sigma_{i=1}^N m_i \cdot \log P(f_{ir}^d|C)$$

Where $\alpha_r$ are weights of each aspect (they can be determined manually or automatically from a training set).

More generally, dependencies between the different descriptor types can be taken into account by setting:

$$F_Q = [(\Sigma_{i=1}^N m_i \cdot \log P(f_{i1}^d|C))^{0.5}, \ldots, (\Sigma_{i=1}^N m_i F(f_{iR}^d|C))^{0.5}]$$

And:

$$\text{PredictabilityScore}(d|C) = F_Q^T * A * F_Q$$

Where A encapsulates the dependencies between the different descriptor types (a diagonal matrix A will yield the previous formula, while taking the covariance matrix estimated empirically will yield the general formula).

Empirical Predictability Improvement.

The predictability score can be further improved using empirical post-processing.

Specifically, given a single media entity d, sometimes the predictability scores for several media references PredictabilityScore($d|C_1$), ..., PredictabilityScore($d|C_S$) are dependent.

As a result, comparing between different reference media sets can be improved by empirically estimating the distribution of the predictability score over a "training" set. This training set aims to represent the set of queries, so it is best (if possible) to draw it randomly from the query set. Note that the distribution that we are trying to estimate now is simply the distribution of the predictability scores of a media entity given a set of references $C_1, \ldots C_S$ (note that this generated a new "feature" vector of dimension S for representing the query media). A straightforward approach is to use the non-parametric Parzen estimation, which has been described earlier, or recursively using our non-parametric likelihood estimation.

Media Analysis Building Blocks

In this section we describe how to derive each building block using the media predictability framework. The text below refers to the case of using a single aspect but the same approach holds for multiple aspects.

Figure 6:
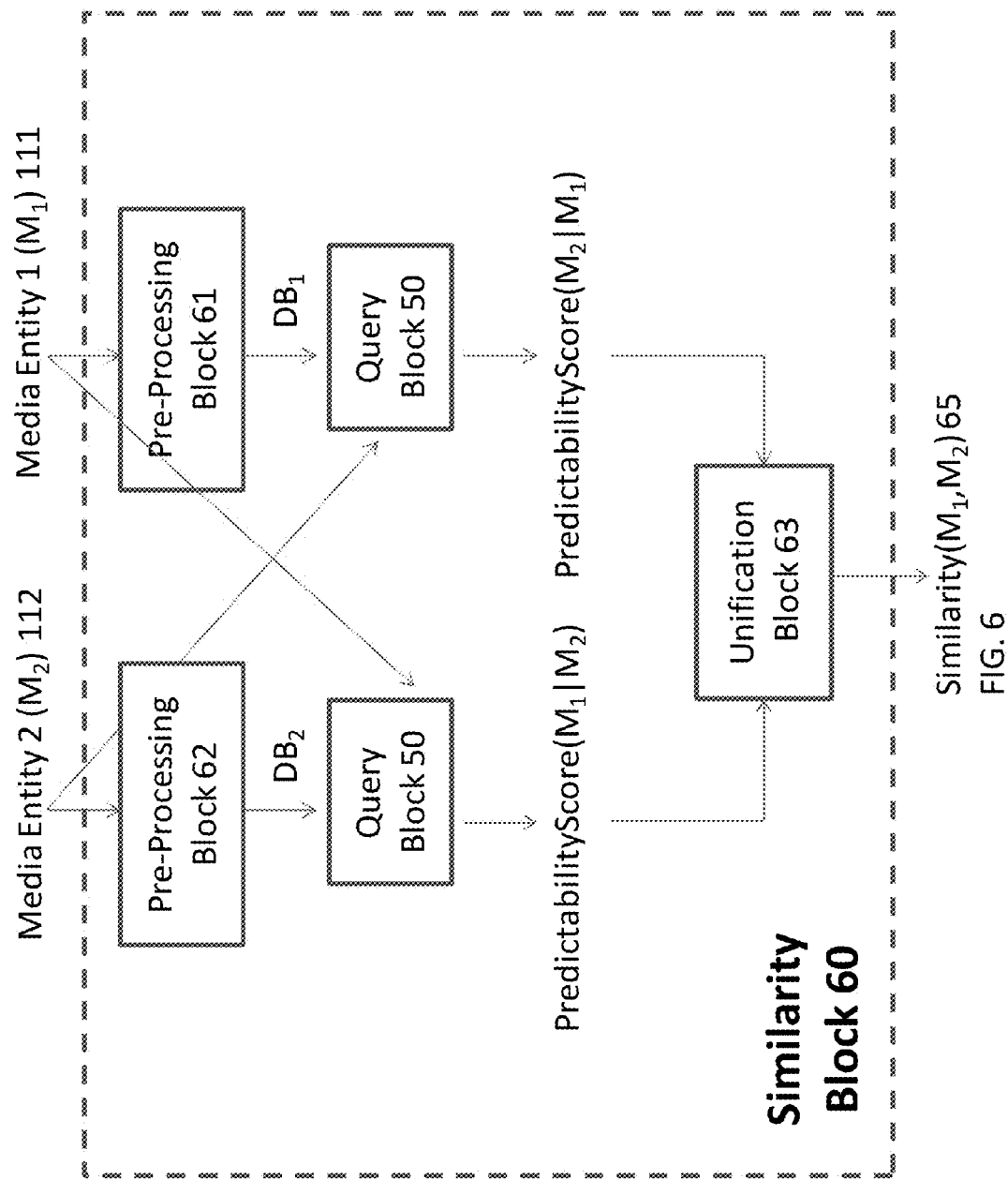
FIG. 6 illustrates a similarity block according to an embodiment of the invention.

FIG. 6 illustrates a similarity block 60 according to an embodiment of the invention.

The similarity block 60 (also referred to as a similarity building block) is used to quantify the similarity between two media entities M1,M2. To do so, we use each media entity twice: once as a reference, and once as a query.

Referring to FIG. 6, the similarity block 60 receives a first media entity 111 and a second media entity 112. The first media entity is provided to a pre-processing block 61 (when used as a reference) that extracts first media entity descriptor space representatives that are fed (in addition to the second media entity) to a query block 50. The query block 50 outputs a predictability score of the second media entity given the first media entity.

The second media entity is provided to a pre-processing block 61 (when used as a reference) that extracts second media entity descriptor space representatives that are fed (in addition to the first media entity) to another query block 50. The other query block 50 outputs a predictability score of the first media entity given the second media entity.

Both predictability scores are fed to a unification unit 53 that outputs similarity(M1, M2) 65.

In more details:

A descriptor database is constructed from each media entity (using the pre-processing block—as was shown in the pre-processing section of the predictability framework).

The predictability PredictabilityScore($M_1|M_2$) of media entity $M_1$ given the media entity $M_2$ as a reference is computed using the query block (as shown in the query section of the predictability framework).

Similarly, the predictability PredictabilityScore($M_2|M_1$) of media entity $M_2$ given the media entity $M_1$ as a reference is computed.

The two predictability scores are combined to produce a single similarity measure. As a combination function, one can use any bimodal operator according to the specific application, such as the 'average' or the 'max' operators.

The "Classification" Building Block

Figure 7:
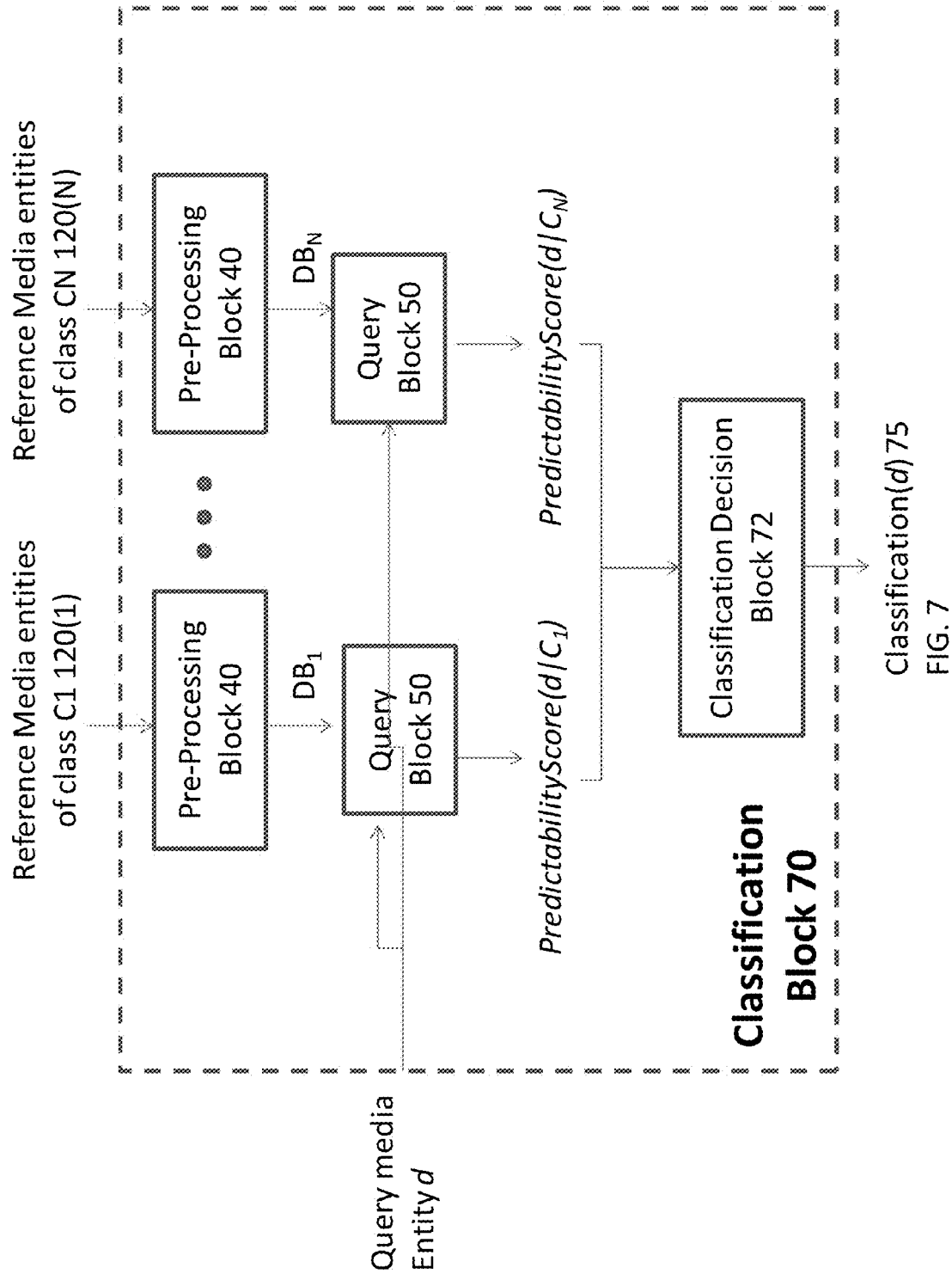
FIG. 7 illustrates a classification block according to an embodiment of the invention.

FIG. 7 illustrates a classification building block 70 according to an embodiment of the invention. The classification building block is also referred to as classification block.

The classification building block is used to classify a media entity into one of several classes. To do so, we collect a set of media entities that relates to each class, construct a media descriptor DB from each reference class, and compare the query media to all of them using the query building block.

The classification block 70 receives reference media entities of each class out of multiple media classes—C1 120(1)-120(N).

A query media entity d 104 and reference media entities of each class are fed to N query blocks 50—each query block receives the query media entity d and one of the reference media entities of a class—separate query blocks receive reference media entities of different classes. Each query block 50 outputs a predictability score of the query media entity given the media entity class. A classification decision block 72 classifies the query media entity to one or these classes base don the predictability scores.

In more details:

For each class $C_i$, an example set of media entities relating to this class is selected.

For each set of entities, a descriptor database $DB_i$ is constructed using the pre-processing block—as was shown in the pre-processing section of the predictability framework.

The predictability PredictabilityScore($d|C_i$) of the query media entity d given each class is estimated using the query block (as shown in the query section of the predictability framework).

Finally, the predictability scores are entered into the classification decision block, which outputs the classification of d (Note that the classification doesn't necessarily have to be a hard decision on a single class, but it can be the posterior probability of d to belong to each class). The simplest decision rule is setting the classification of d to be the class C for which the predictability score of d given C is the highest. But other decision rules are also possible—for example, computing posterior probabilities (given the prior probabilities of each class). In addition, the distribution of the predictability scores given all (or subset) of the classes can be estimated using a "training" set. (A simple way to do it is using the non-parametric Parzen estimation, as described earlier). With this empirical distribution estimation, the probability of classifying d with each class can now be determined directly from the distribution, providing "Empirically Corrected" probabilities.

The "Detection" Building Block

The classification block can operate as a detection block. Assuming that a certain feature is being searched in a query media stream. One reference media entity class is selected as including the feature as another reference media entity class is selected as not including the feature. The query media entity and these two media entity classes are fed to the classification block that classifies the query media entity as being included in one of these media classes-a s including the feature or not including the feature. It is noted that more than two media classes can be provided and may include different associations with the feature (not just a binary relationship of including or not including the feature).

Figure 10:
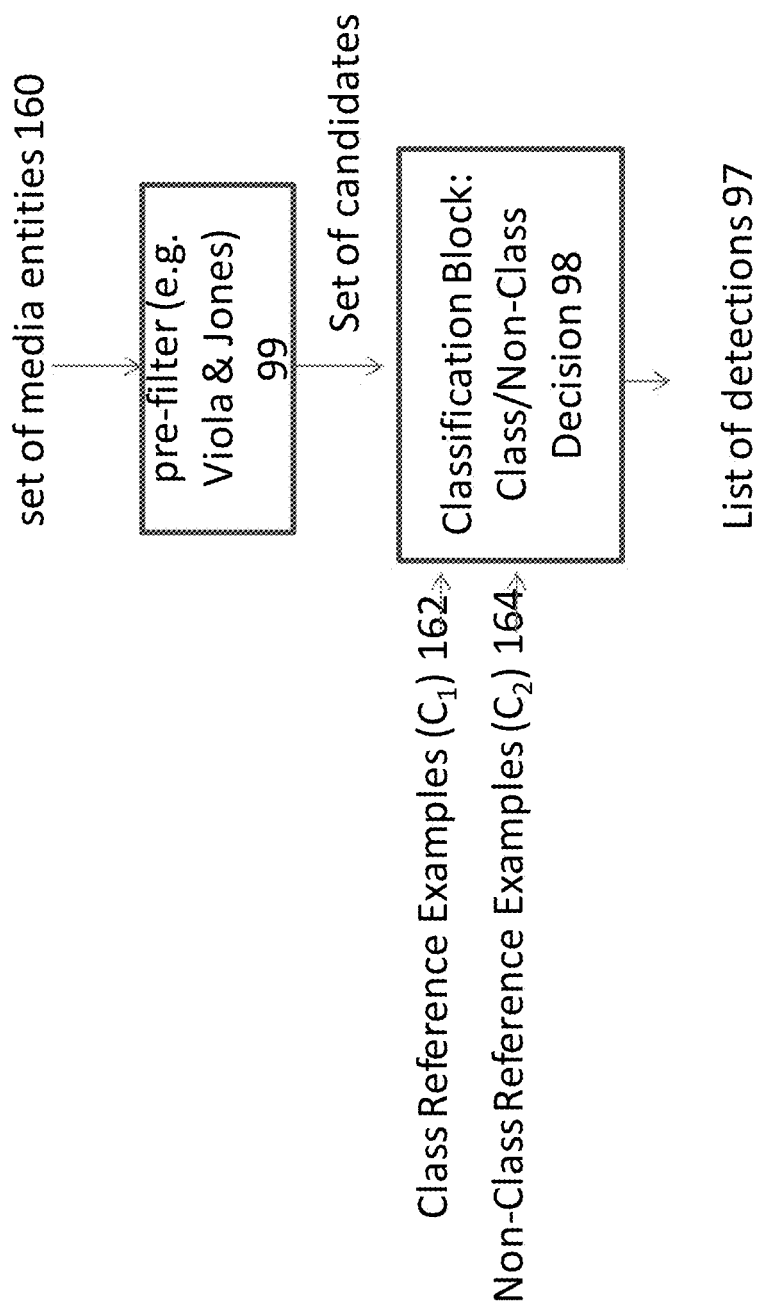
FIG. 10 illustrates a detection block according to an embodiment of the invention.

FIG. 10 illustrates a decision block according to an embodiment of the invention. A set of media entities 160 that is pre-filtered 99 to provide a set of candidates for searching the feature within. The set of candidates and two classes of reference examples 162 and 164 are provided to a classification block 98 that decides whether the feature exists in the candidates. The output is a list of detections 97 that indicates in which candidates the feature appears.

The detection building block is used to detect some predefined class (for example—face detection, or a detection of some specific person) inside a set of media entities. The detection building block is actually a special case of the classification building block, in which the two reference classes are the "Class" and the "Non-Class" (for example—"Face"-"Non Face", "Speech"-"Non-Speech"), and the set of queries is all the sub-segments of the media for which we would like to apply the detection—for example, a set of sub-windows in a image.

Since the classification process usually takes too much time to be applied on all sub-segments, a pre-filtering can be applied, choosing only a subset of the segments. For example, the cascade based Viola & Jones method is widely used for object (e.g., face) detection, outputting a set of rectangles for which a face was detected. Yet, it also outputs a large set of erroneous detections, which can be further eliminated by the "Class"-"Non Class" detection block describe herein. See for a schematic description of the detection building block.

The "Clustering" building block

The clustering building block is used to cluster a set of media entities into groups. This building block is using the similarity building block described above to compute a similarity measure between pairs of media entities, and then use standard clustering methods to cluster the affinity matrix.

Figure 8:
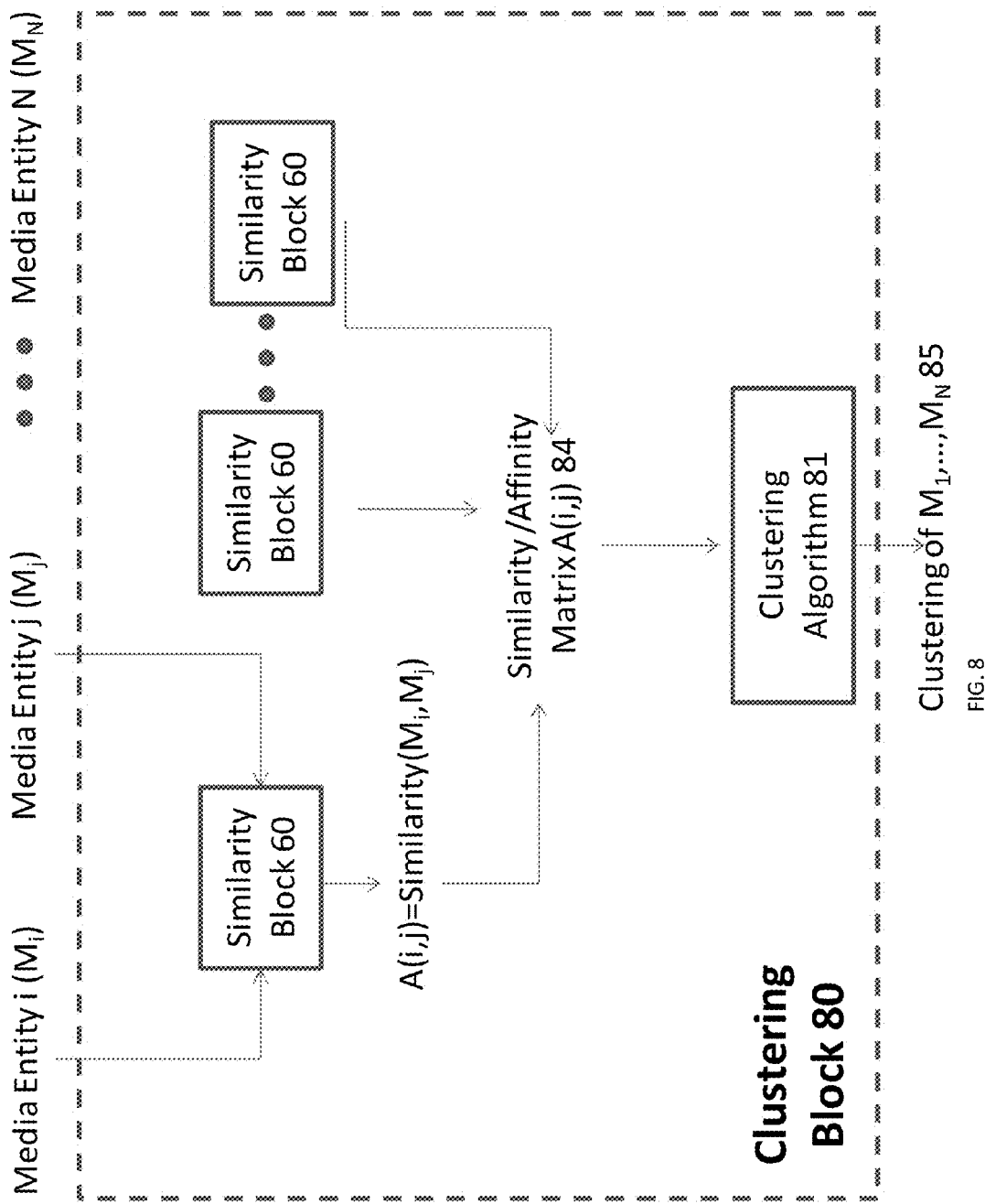
FIG. 8 illustrates a clustering block according to an embodiment of the invention.

FIG. 8 illustrates a clustering block 80 according to an embodiment of the invention.

The clustering block 80 includes multiple similarity blocks 60 that are fed with different media entities. During each iteration the clustering blocks output a similarity score between two media entities. These similarity scores can be arranged to form a similarity/affinity matrix (or any other data structure) that is fed to a clustering algorithm 81 that clusters the media entities based on the similarity scores—clustering M1, . . . , MN 85.

In more details:

For each pair of media entities $M_i$ and $M_j$, the similarity between them is computed using the similarity building block (described above).

A similarity matrix $A_{ij}$ is computed by $A_{ij}$=similarity ($M_i$, $M_j$). This similarity matrix forms an Affinity matrix which is a common input for many clustering algorithms.

Finally, doing clustering from a Similarity or an Affinity matrix is well known in the art (For example, Agglomerative hierarchical clustering, spectral clustering (Andrew Y. Ng and Michael I. Jordan and Yair Weiss 2001) or simply merging all pairs for which similarity($M_i$, $M_j$)>Threshold.

The "Saliensee" Building Block

Figure 9:
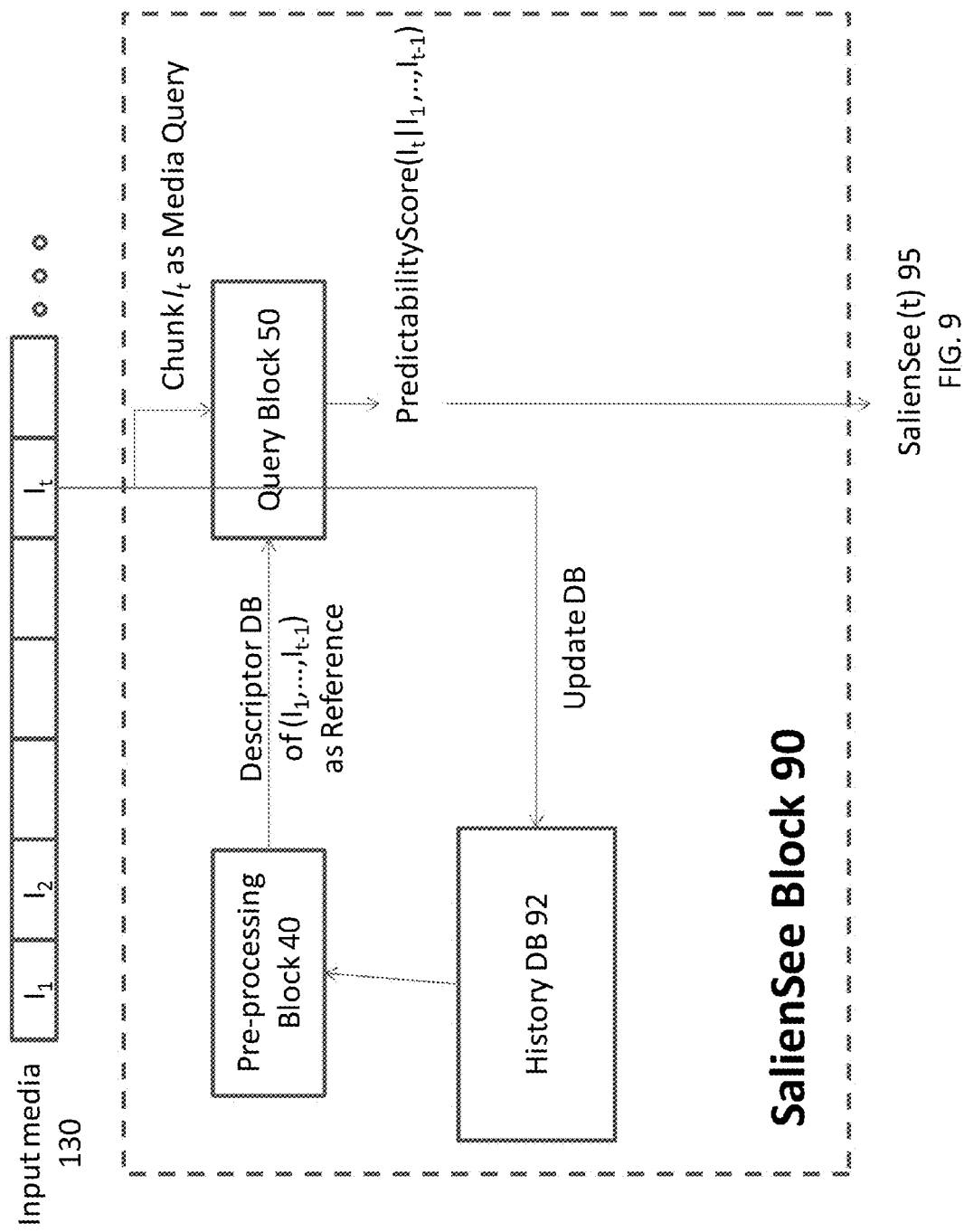
FIG. 9 illustrates a SalienSee block according to an embodiment of the invention.

FIG. 9 illustrates a SalienSee block 90 according to an embodiment of the invention.

The SalienSee block tries to predict a portion of a media entity (It) based on previous media entity portions (I1 . . . It−1) that precede it.

An input media entity 130 that includes multiple media entity portions is fed to the SalienSee block 90 one media entity portion after the other so that the media entity portions can be evaluated in an iterative manner—one after the other.

At point of time t a media entity portion (It) based on previous media entity portions (I1 . . . It−1) that precede it.

Query block 50 receives (as a query media entity) the media entity portion It and receives (as reference descriptor space representative) descriptors space representatives of the previous media entity portions.

The query block 50 calculates a predictability score that may be regarded as a saltiness score 95, The media entity portions are also fed to a database 92. The content of the database are processed by pre-processing block 40.

The proposed method uses a new measure called "SalienSee". It measures the extent by which a point in time in the media is salient in the media. This can also indicate that this point in time is "surprising", "unusual" or "interesting". We say that a media entity has high SalienSee if it cannot be predicted from some reference set of media entities. Let d be some query media entity, and let C denote the reference set of media entities. We define the SalienSee of d with respect to C as the negative log predictability of d given C (i.e. SalienSee (d|C)=−log PredictabilityScore(d|C)). Using this notation, we can say an event is unusual if its SalienSee measure given other events is high. For instance, the SalienSee measure can capture the moments in video in which the activity becomes boring (which is very common in a personal video)—for example, when someone starts jumping it might be interesting, but the next jumps are getting more and more boring as they are already very predictable from the past. Formally, let I ($t_1$, $t_2$) denote the time segment $t_1$<t<$t_2$ of the video clip d. We say that the video d (t, t+δt) is 'boring' if its SalienSee measure with respect to the past is small, i.e, if SalienSee(d (t,t+δt)|d(t−T,t))<S, where T, δt are some periods of time (e.g. —T is a minute, δt is a second.

Implementing the Personal Video Features Above Using the Building Blocks

As shown in the previous sub-section, all the basic building blocks that are used by the proposed method can be directly implemented using the media predictability framework. Next, we show how these building blocks (e.g., Recognition, Clustering) can be used to realize the long list of features, presented above, in order to enable comprehensive solution for searching, browsing, editing and production of personal video.

Tagging: Automatic tagging of media entities is achieved by applying the Detection/Recognition building block several times. Some tags are extracted by solving a detection problem. For instance adding a tag "face" whenever the face detector detected a face in a video clip, or a tag "applause" when a sound of clapping hands is detected. Other types of tags are extracted by solving a recognition (or classification) problem. For instance, a specific person-tag is added whenever the face-recognition module classifies a detected face as a specific, previously known face. Another example is classifying a scene to be "living-room scene" out of several possibilities of pre-defined scene location types. The combination of many detection and recognition modules can produce a rich and deep tagging of the media assets, which is valuable for many of the features described below.

The method utilizes at least some of the following tagging: face poses ("frontal", "profile" etc.), specific persons, facial expressions ("smile", "frown" etc.), scene-types ("living-room", "backyard", "seaside" etc.), behavior type ("running", "jumping", "dancing", "clapping-hands" etc.), speech detection, soundtrack segment beat classification (e.g. "fast-beat", "medium-beat", "slow beat"), voice classification ("speech", "shout", "giggle", etc.). Note that the Media Predictability Framework enables a single unified method to handle recognition and detection problems from completely different domains (from behavior recognition to audio classification), simply by supplying examples from the recognized classes (whether video, image or audio examples).

ImportanSee: our "ImportanSee" measure is used to describe the importance or the amount of interest of a video clip for some application—for example, in a video summary we can display only the important parts while omitting the non important ones. In principle, this measure is subjective, and cannot be determined automatically. However, in many cases it can be estimated with no user intervention using attributes such as the attributes listed below:

SalienSee—Very low saliency clips are usually boring and not important. Therefore, we can attribute low importanSee to those clips.

Camera Motion: Camera motion is an important source of information on the intent of the cameraman. A panning of the camera usually indicates that the photographer is either scanning the scene (to get a panorama of the view), or just changing the focus of attention. Video segments that relates to the second option (a wandering camera) can be assigned with a low ImportanSee. A case where the camera is very shaking and not stabilized can also reduce the overall ImportanSee. The camera motion can be estimated using various common methods (e.g. (J. R. Bergen, P. Anandan, K. J. Hanna, and R. Hingorani 1992)).

Camera Zoom: A Camera zoom-in is usually a good indication for high importance (i.e., resulting in high ImportanSee). In many cases, the photographer zooms in on some object of interest to get a close-up view of the subject (or event).

Face close-up: Images or video clips in which faces appear in the scene are usually important. Specifically, a close-up on a face (in a frontal view) will usually indicate a clear intention of the photographer to capture the person (or persons) being photographed, and can serve as a strong cue for high importanSee.

Speech: Speech detection and recognition can help detecting interesting periods in the video. Moreover, laughter (general, or of a child) increases the ImportanSee measure of the corresponding video segment. An excited voice may also be used as a cue for importanSee.

Facial expressions: Facial expressions are a good cue for high ImportanSee. For instance, moments when a person smiles or a child frowns or cries indicates a high ImportanSee.

Given a visual entity d (for example, a video segment), the attributes above can be used to compute intermediate importance scores $s_1, \ldots s_l$ (in our implementation, these scores can be negative. Such scores can be obtained by using direct measurements (e.g, SalienSee measure of a clip), or by some binary predicate using the extracted meta-data (e.g., s=1 if clip includes a 'large face closeup' tag and s=0 otherwise). The final ImportanSee measure is given as a weighted sum of all attribute scores. I.e., ImportanSee(d)=max ($\Sigma_i \alpha_i s_i$, 0), where $\alpha_i$ is the relative weights of each attribute.

Table of content: Table of (visual) content is a hierarchical segmentation of visual entities (video or set of videos and images). This feature can be implemented as a clustering of the various scenes in a video. For instance, by sampling short video chunks (e.g., 1 second of video every 5 seconds of video) and clustering these media chunks (using the clustering building block) will produce a flat or hierarchical table of contents of the video. In addition to this segmentation, each segment is attached with either a textual or visual short description (for example, a representative frame or a short clip). This representative can be selected randomly, or according to its ImportanSee measure.

Intelligent preview and thumbnails: This is a very short (e.g., 5-10 seconds long) summary of the most representative and important portions of the video. This feature can be implemented by simply selecting the time segments of the video with the maximal ImportanSee.

Video links and Associative browsing: This feature facilitates video and image links, which are based on audio-visual and semantic similarity. This feature can be implemented as a combination of using the Tagging feature and the similarity building block: The similarity building block is used to quantify the direct audio-visual similarity between images and video. The Tagging feature is used to quantify the semantic association between media entities—for instance, two videos of birthday parties, two videos of dogs etc. To quantify the semantic similarity, various simple distances can be used between the tag lists of each media entity, such as the number of mutual tags or a weighted sum of the mutual tags, which emphasizes some tags over others. To quantify the overall similarity a (weighted) sum of the semantic and audio-visual similarity can be used to combine the different similarity measures. Links between media entities can be formed for pairs of entities with high enough overall similarity.

Content-based fast forward: In Content-based fast-forward, interesting parts are displayed in a normal speed (or with a small speed-up), while less interesting parts are skipped (or displayed very fast). This can be done automatically using the ImportanSee measure: The speed-up of each video segment d is determined as a function of its ImportanSee, I.e. speedup(d)=F(ImportanSee(d)). Two simple examples for F are F(x)=1/x and the threshold function $$F(x) = \begin{cases} 1 & F(x) > S \\ \infty & F(x) \le S \end{cases}$$

(which is equivalent to selecting the important video segments).

Automatic Video Editing & Synopsis: The main challenge in automatic video editing is to automatically select the most important sub-clips in the video, which best represent the content of the original video. This selection is an essential stage for most of the features that relates to automatic video editing: creating a video synopsis (or Movie "Trailer"), video production, intelligent thumbnails, etc'. This task is best served by the ImportanSee building block (describe above)—to determine the importance of each sub-clip in the video, and promoting the selection of the most important ones to be used in the edited video. Using the fact that we can compute the ImportanSee measure on any video sub-clip we define a video editing score for a video editing selection of clips $c_1, \ldots, c_n$ from a video v: score($c_1, \ldots, c_n$)=$\Sigma_i$ ImportanSee($c_i$).

Thus we can pose the problem of automatic video editing as an optimization of the editing score above given some constraints (e.g., such that the total length of all selected sub-clips is not longer than one-minute). This is a highly non-continuous function and is best-optimized using stochastic optimization techniques (e.g., Simulated Annealing, Genetic Algorithms) where the score function is used to evaluate the quality of a selection and random selection and mutation (e.g., slightly changing clip starting and ending points) enables discovery of the problem-space during the optimization process.

System

Figure 12:
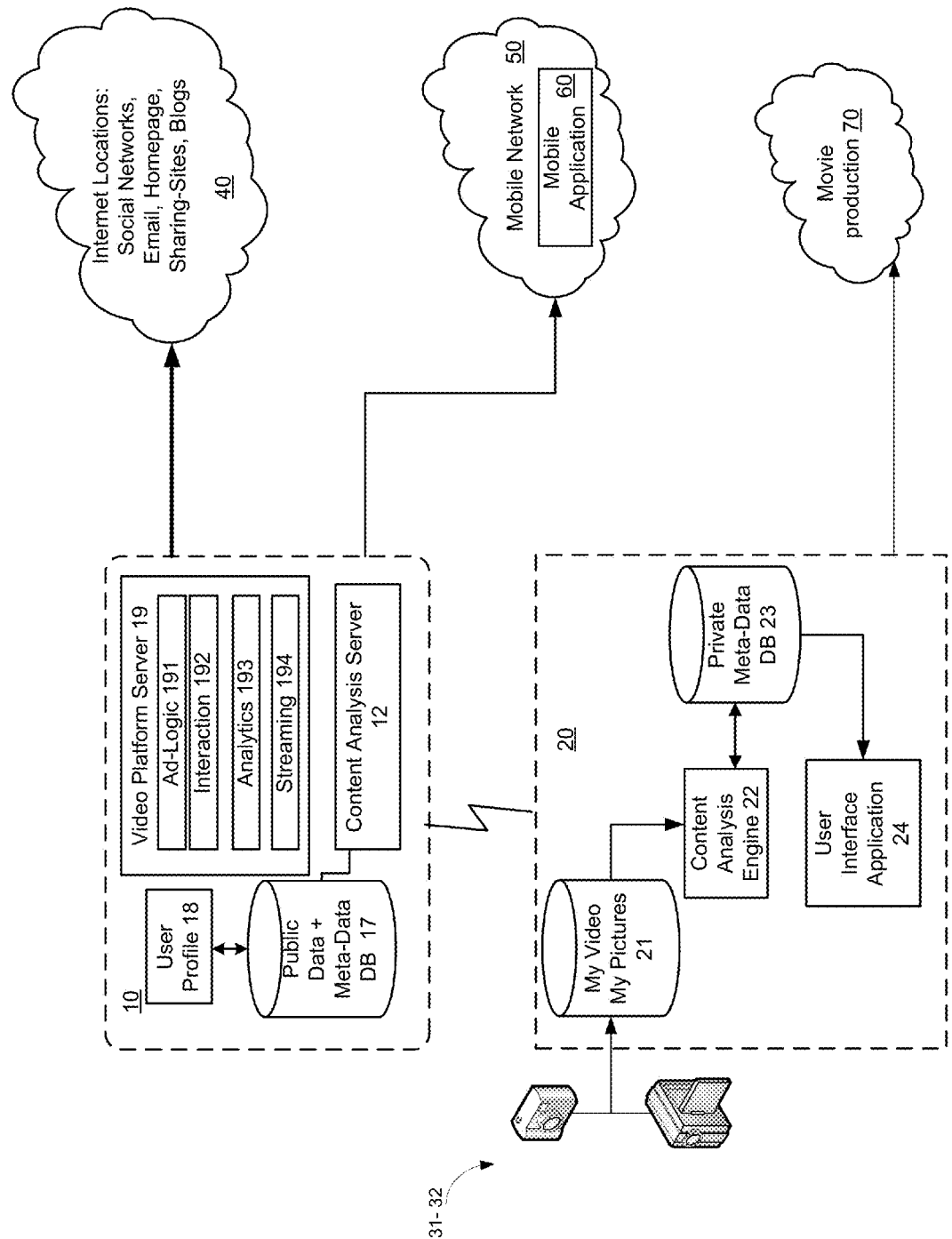
FIG. 12 illustrates a system and its environment according to an embodiment of the invention.

FIG. 12 illustrates a system and its environment according to an embodiment of the invention. The system implements any of the methods described above to provide a comprehensive solution for browsing, searching and sharing of personal video.

The system has various components which reside on several sites. The related sites and the components on them are described next.

User Computer 20—The user computer(Desktop, Laptop, Tablet, Media-Center, Pocket PC, Smartphone etc.) may include two databases 21 and 23, content analysis engine 22 and user interface application 24.

The user computer can store a large amount of visual data in general locations such as 'My Video' and 'My Pictures' directories in Microsoft Windows Operation Systems. Most of the data in these locations is raw data and yet personal.

The content analysis engine 22 may process runs in the background (optionally only during the computer idle time) or upon user request. It analyzes the user's visual data (videos and pictures), and extracts meta-data using a work queue.

The work queue is filled by the content analysis engine 22 as well as by the user selection (a user can insert any video or image to the top of the queue).

While the original video and images of the user may remain intact, the content analysis engine 22 may use the private Meta-Data DB 23 to store the extracted meta-data and reuses this meta-data for its own analysis (e.g., extracted visual tags are stored there for future automatic tagging).

In a difference embodiment the content analysis engine 22 is not a software installed on the user computer 20, but rather an internet browser plug-in or a software component (e.g., ActiveX) which enables the user to apply the content analysis engine 22 to run without full software installation (but a plug-in installation). In another embodiment of this system, there is not content analysis engine on the 'User Computer'. Instead, the user can make use of content analysis server software (12) as a service which resides on the interaction server 10.

The user interface application 24 lets the user apply a sub-set of the method capabilities discussed above, thus enabling browsing, searching and sharing of personal video. The sub-set depends on the type of client, license and computer. In one embodiment, this is a standalone client installed on the user computer. In another embodiment, this is a web application which uses an internet browser for running the user interface, which enables running it from any internet browser, without installing software.

Interaction Server

The interaction server 10 hosts several servers which enable users to share personal video and images and broadcast them on various internet locations by embedding them. The 'User Profile' 18 contains various information about the user such as its personal details, a list of accounts in various internet services, a list of friend and family members and usage statistics. The 'Public Data+Meta-Data DB' 17 contains data that the user selected to share from the 'User Computer': relevant meta-data and also video clips, images, etc. Sharing can be limited to various groups—family, friends, everyone etc. The database is also responsible for initiating synchronization with connected 'User Computers' and mobile appliances. The 'Content Analysis Server' 12 is a powerful version of the content analysis engine on the user computer 20 which enables to process a large amount of visual data being uploaded to the site. This enables the user to process video even from a computer that does not have the content analysis engine installed (i.e., SaaS—Software as a Service).

The 'Video Platform Server' 19 performs the actual streaming and interaction with users and visitors that view video and images stored on the 'Interaction server'. It contains the actual 'Streaming' module 194 which is responsible for the actual delivery of the video on time and with the right quality. The 'Interaction' module 192 is responsible for interpreting the user requests (e.g., press on a table of contents element) and communicate it with the 'Streaming' server or the 'Local Player'. The 'Analytics' module 193 is responsible for recording user behavior and response for each video and advertise that was displayed on it (e.g., number of times a video was watched, number of skips, number of times an ad was watched till its end). The 'Ad-Logic' 191 uses information from the 'Analytics' module to choose the best strategy to select an ad for a specific video and user and how to display it. This information is synchronized in real-time with the 'Local Player'. The 'Ad-Logic' module can instruct the 'Local Player' to display an ad in various forms, including: pre-roll, post-roll, banners, floating ads, textual ads, bubble ads, ads embedded as visual objects using the extracted video metadata (e.g., adding a Coca-Cola bottle on a table).

Internet Locations

Users and visitors can view video and images which users decided to share on various 'Internet Locations' 40 that may include social networks, email services, blogs, MySpace, Gmail, Drupel, Facebook and the like. The actual viewing of video is performed by an embedded player which can be based on various platforms such as Adobe Flash, Microsoft Silverlight, HTML5 etc. The player can be embedded either directly or using a local application (e.g., Facebook application) in various internet locations including: Social Networks (e.g., Facebook, Myspace), Email messages, Homepages, Sharing-Sites (e.g, Flickr, Picasa), Blogging sites and platforms (e.g., Wordpress, Blogger) and Content Management Systems (e.g., Drupal, Wikimedia). Alternatively to embedding a 'Local Player' the user can user an internet link to a dedicated video page on the 'Interaction server'.

Mobile Networks

Users can view and synchronize video via mobile appliances (e.g., cell phones) using the cellular networks 50 or internet networks 40. In cases that the mobile appliance is computationally strong enough (e.g., Pocket-PC, Smartphone) it can be regarded as a 'User Computer'. In other cases it can use a 'Mobile Application' which enables to view media from the 'Interaction server' as well as uploading raw media from the mobile appliance. In this manner the 'Mobile Application' can use the 'Content Analysis Server' in the 'Interaction server' to produce and share video even for appliances with low computational powers. Moreover, the 'Interaction server' can automatically synchronize uploaded content with other connected 'User Computers'.

Movie Production

Users can select to send automatically produced media for further, professional production by human experts. The system proceeds by sending the relevant raw video, the extracted meta-data and the automatically produced video to a professional producer 70 (via internet or via a delivery service using DVDs etc.). After the professional editing is finished, the user receives a final product (e.g., produced DVD) via mail or delivery.

Other Electronic Appliances

In other embodiments, the system is implemented on 'Other Electronic Appliances' with do not utilize general CPUs or without enough computational power. In these cases, parts of the software modules described in user computer are implemented in embedded form (ASIC, FPGA, DSP etc.).

Figure 13:
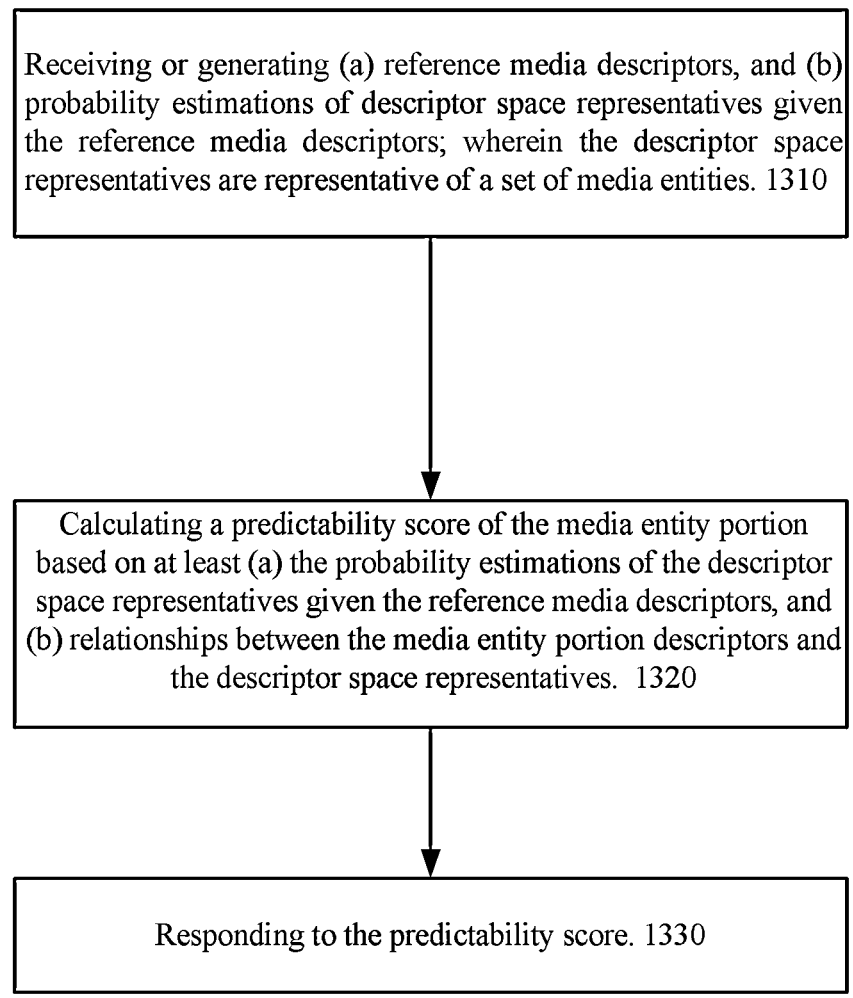

FIG. 13 illustrates method 1300 according to an embodiment of the invention. Method 1300 is for determining a predictability of a media entity portion.

Method 1300 starts by stage 1310 of receiving or generating (a) reference media descriptors, and (b) probability estimations of descriptor space representatives given the reference media descriptors; wherein the descriptor space representatives are representative of a set of media entities.

Stage 1310 is followed by stage 1320 of calculating a predictability score of the media entity portion based on at least (a) the probability estimations of the descriptor space representatives given the reference media descriptors, and (b) relationships between the media entity portion descriptors and the descriptor space representatives.

Stage 1320 may be followed by stage 1330 of responding to the predictability score.

Stages 1310-1330 can be repeated multiple times on multiple media entity portions.

Stage 1320 may include at least one of the following: (a) calculating distances between descriptors of the media entity and the descriptor space representatives; (b) calculating a weighted sum of probability estimations of the descriptor space representatives, wherein weights applied for the weighted sum are determined according to distances between descriptors of the media entity portion and descriptor space representatives; (c) generating the probability estimations given the reference media descriptors; wherein the generating comprises calculating, for each descriptor space representative, a Parzen estimation of a probability of the descriptor space representative given the reference media descriptors.

According to an embodiment of the invention method 1300 may be applied on different portions of a media entity in order to locate media portions of interest. Thus, stage 1320 may include calculating the predictability of the media entity portion based on reference media descriptors that represent media entity portions that precede the media entity portion and belong to a same media entity as the media entity portion. Repeating stage 1310 and 1320 on multiple portions of the media entity can result in calculating the predictability of multiple media entity portions of the media entity and detecting media entity portions of interest. Stage 1330 may include generating a representation of the media entity from the media entity portions of interest.

According to an embodiment of the importance of a media entity portion can be determined based on additional factors. Thus, stage 1320 can be augmented to include defining a media entity portion as a media entity portion of interest based on the predictability of the media entity portion and on at least one out of a detection of a camera motion, a detection of a camera zoom or a detection of a face close-up.

FIG. 14 illustrates method 1400 according to an embodiment of the invention. Method 1400 is for evaluating a relationship between a first media entity and a second media entity.

Method 1400 starts by stage 1410 of determining a predictability of the first media entity given the second media entity based on (a) probability estimations of descriptor space representatives given second media entity descriptors, wherein the descriptor space representatives are representative of a set of media entities and (b) relationships between second media entity descriptors and descriptors of the first media entity.

Stage 1410 is followed by stage 1420 of determining a predictability of the second media entity given the first media entity based on (a) probability estimations of descriptor space representatives given first media entity descriptors, and (b) the relationships between first media entity descriptors and descriptors of the second media entity.

Stage 1420 is followed by stage 1430 of evaluating a similarity value between the first media entity and the second media entity based on the predictability of the first media entity given the second media entity and the predictability of the second media entity given the first media entity.

Stage 1400 may be repeated multiple times, on multiple media entity portions. For example, it may include evaluating the relationships between multiple first media entities and multiple second media entities based on a predictability of each first media entity given the multiple second media entities and a predictability of each second media entity given the first media entity.

Method 1400 can be used for clustering—by evaluating the sumilatiry value of a media entity to a cluster of media entities. Thus, method 1400 can include clustering first and second media entities based on the relationships between the multiple first media entities and the multiple second media entities.

Figure 15:
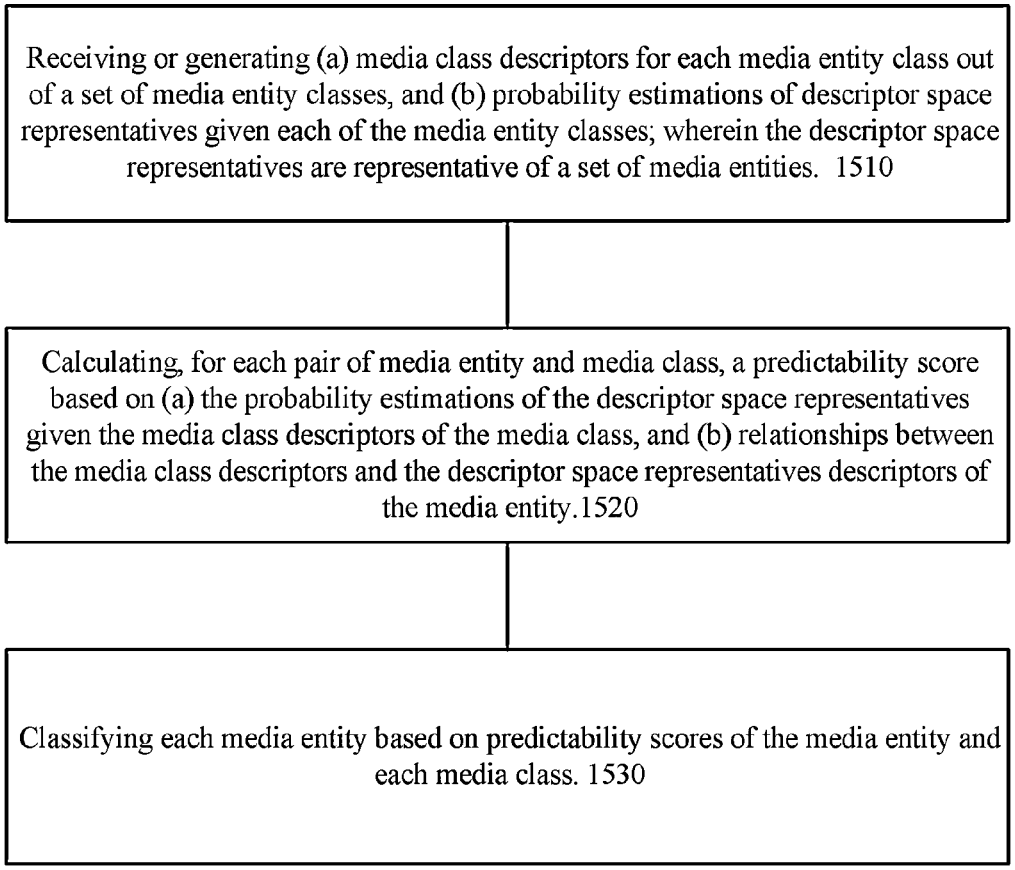

FIG. 15 illustrates method 1500 according to an embodiment of the invention. Method 1500 is for classifying media entities.

Method 1500 starts by stage 1510 of receiving or generating (a) media class descriptors for each media entity class out of a set of media entity classes, and (b) probability estimations of descriptor space representatives given each of the media entity classes; wherein the descriptor space representatives are representative of a set of media entities.

Stage 1510 is followed by stage 1520 of calculating, for each pair of media entity and media class, a predictability score based on (a) the probability estimations of the descriptor space representatives given the media class descriptors of the media class, and (b) relationships between the media class descriptors and the descriptor space representatives descriptors of the media entity.

Stage 1520 is followed by stage 1530 of classifying each media entity based on predictability scores of the media entity and each media class.

FIG. 16 illustrates method 1600 according to an embodiment of the invention. Method 1600 is for searching for a feature in a media entity.

Method 1600 starts by stage 1610 of receiving or generating first media class descriptors and second media class descriptors; wherein the first media class descriptors represent a first media class of media entities that comprises a first media feature; wherein the second media class descriptors represent a second media class of media entities that does not comprise the first media feature.

Stage 1610 is followed by stage 1620 of calculating a predictability score given a first media class based on (a) probability estimations of descriptor space representatives given the first media class descriptors, and (b) relationships between the first media class descriptors and descriptors of the media entity.

Stage 1620 is followed by stage 1630 of calculating a second media class predictability score based on (a) probability estimations of descriptor space representatives given the second media class descriptors, and (b) relationships between the second media class descriptors and descriptors of the media entity.

Stage 1630 is followed by stage 1640 of determining whether the media entity comprises the feature based on the first media class predictability score and the second media class predictability score.

Stage 1640 can be followed by stage 1650 of responding to the determination. For example, stage 1650 may include detecting media entities of interest in response to a detection of the feature.

Stage 1600 can be repeated in order to detect a feature in multiple media entities by repeating, for each media entity stages 1610-1650.

The feature can be a face but this is not necessarily so.

Figure 17:
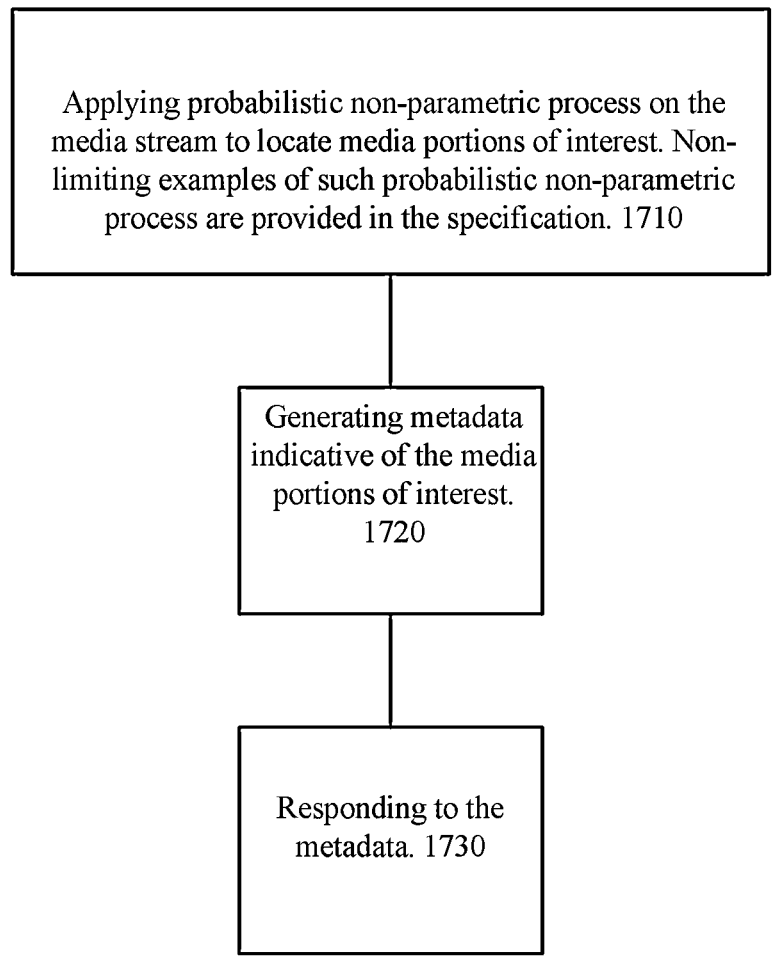

FIG. 17 illustrates method 1700 according to an embodiment of the invention. Method 1700 is for processing media streams.

Method 1700 starts by stage 1710 of applying probabilistic non-parametric process on the media stream to locate media portions of interest. Non-limiting examples of such probabilistic non-parametric process are provided in the specification.

A non-parametric probability estimation is an estimation that does not rely on data relating to predefined (or known in advance) probability distribution, but derive probability estimations directly from the (sample) data.

Stage 1710 may include detecting media portions of interest in response to at least one additional parameter out of: (a) a detection of a change of focal length of a camera that acquires the media; (b) a detection of a motion of the camera; (c) a detection of a face; (d) a detection of predefined sounds; (e) a detection of laughter; (f) a detection of predefined facial expressions; (g) a detection of an excited voice, and (h) detection of predefined behavior Stage 1710 is followed by stage 1720 of generating metadata indicative of the media portions of interest.

Stage 1720 may include adding tags to the media portions of interest.

Stage 1720 is followed by stage 1730 of responding to the metadata.

Stage 1730 may include at least one of the following: (a) generating a representation of the media stream from the media portions of interest; (b) generating a trick play media stream that comprises the media portions of interest; (c) finding media portions of interest that are similar to each other; (d) tagging media portions of interest that are similar to each other; and (e) editing the media stream based on the media portions of interest.

Disclosed are solutions that extract visual tags using a non-parametric approach, and does content moderation based on these visual tags. The visual information can be incorporated, according to various embodiments of the invention, with additional information (text, links) to improve results.

Provided are methods and systems to the problem of visual content moderation using computerized image and video content analysis.

The raw data is first being visually analyzed, providing a visual meta-data. The visual meta-data can include, for example, the existence of a face in the scene. Such a tagging can be done using the "Detection Block" (FIG. 10). Another example for a visual meta-data is the likelihood of an image or a video clip to belong to some visual class, such as being an indoor or outdoor scene. Such a tagging can be done using the "Classification Block" (FIG. 7). More examples for visual tags that can be detected in an image or video are: face posses, body, upper body, position (sitting, standing, etc'), nude person, dressed peron,patially-dressed person, person, man/woman, body parts, sexual activity (for video), moving body (for video), moving part (for video), general movement.

The visual meta-data is used to attach semantic tags to the raw data, such as "Nudity", "Porn", "Scenery", etc.

According to an embodiment of the invention, semantic tags may be determined from visual meta-data by using a decision tree. For example, saying that an image has "Nudity" in it if [,(naked−person)>$p_1$] (wherein p indicates probability and $p_1$ is a predetermined threshold) or saying that an image is "Scenery" in high probability if [p(outdoor)<$p_2$&p(people)<$p_3$]. Alternative ways to extract semantic tags and methods to computerize this stage are described in the next sections.

The semantic tags, together with user credentials, are being used as an input for the content moderation stage. This stage determines the suitability of the input raw data to various destination populations. For example, 'Nudity' might be fine for Teenagers, but inappropriate for children. 'Porn' may be appropriate only for adults (or for no one at some populations or setting). Optionally, this stage can involve user intervention. For example—in a video was attached with a "Porn" tag in low probability, we might want to let the video be moderated by a human observer. Finally, the content moderation is followed by an action/decision. Common actions are: Filtering (not displaying the image/video or blocking the entire cite in some cases), Sending a Massage' etc.

A method for operating based on content analysis can include receiving raw data by a visual analysis module, performing visual analysis, applying (on the outcome of the visual analysis) semantic tagging, performing (on the outcome of semantic tagging) moderation and finally performing a decision based on the outcome of the moderation and user credentials.

Visual Analysis

The visual analysis is the stage in which the raw data is being visually analyzed, and a visual meta-data is extracted. The meta-data can include many visual classes, which can be either mutually exclusive or overlap. For example, the visual classes "Indoor Scene" and "Outdoor Scene" are mutually exclusive, while the visual class "Person" has overlap with both. The visual classes can also be hierarchical—for example, "Sexual Activity" can be divided into multiple poses, and a "Person" can be divided into "Female" and "Male" sub-classes (which in turn can also be divided into different poses such as "Standing", "Sitting", "Upper Body", etc.).

For each such visual class, the meta-data can include a type (e.g. class name), a detection score (or probability), and optionally a ROI (for example—bounding box where a face/person was detected, or duration in the video in which nudity has been detected).

Given a new visual entity, the detection of visual classes relies mainly on the "predictability framework" which is described previously in the specification.

From Predictability to Meta-Data

As described before, the visual analysis stage extracts meta-data from the raw data. This meta-data consists of various visual classes (tags) such as, by way of example, faces, scene type, person, nudity, person-at-some-pose, action (for video), etc. In addition, it can include a data on the region of interest related to this visual class—for example, the bounding box in which a "Face" has been detected, or the time frame of a "Running Activity". Finally, the meta-data can include a score or a probability corresponding to each visual class. For example—a "Face" appears at probability 0.9.

Let C be the set of all visual classes, and let d be some visual entity (e.g.—raw data, or some portion of it). Using the predictability framework, we can compute p(d|c) for each c∈C. From these likelihoods, we would like to extract the probabilities $\{p(d \in c)\}_{c \in C}$, i.e. —the probability of d to relate to each visual class. These probabilities are computed as a function f of the likelihoods: $\{p(x \in c)\}_{c \in C} = f(\{p(x|c)\}_{c \in C})$. When the visual classes are mutually exclusive, the function f can be set as the simple Bayesian probability:

$$p(x \in c_0) = \frac{p(x|c_0)}{\Sigma_x p(x|c)}$$

In various embodiments of the invention, more general approaches may be implemented, that use a training set, are based on the SVM classification or using a model-fitting of the log-likelihoods to extract the probabilities (for example—fitting multi-dimensional Gaussians to the log-likelihood scores, as done in our current implementation).

Semantic Tagging

Given the visual meta-data (as discussed above), semantic tags may be attached to the raw data, such as "Nudity", "Porn", "Scenery", etc'. This process is done in the "Semantic Tagging" stage.

A simple way to determine semantic tags from a visual meta-data is by using a decision tree. For example, saying that an image has "Nudity" in it i[p(naked–person)>$p_1$]f or saying that an image is "Scenery" in high probability if [p(outdoor) <$p_2$ & p(people)<$p_3$]. In addition, it is important to notice that a small portion of the visual data may affect the semantic tagging of the entire data. For example—a single nude person appearing in an "innocent" natural scene may cause the entire image to be tagged as "Nudity" instead of "Nature".

Such a decision tree may be built manually, based on some application dependent strategy. However, according to an embodiment of the invention, computerized methods may be implemented which can learn automatically these relations using a training data.

A way to automatically learn the relations between the visual meta-data and the semantic tags is using SVM. A training set of visual data is manually tagged, and the meta-data is extracted for this training set. Then, for each semantic tag S, one can automatically learn a detector of this tag. For example, learning to determine whether an image is "Porn" based on visual meta-data such as the existence (or the probability) of faces, nudity and certain poses in the image.

Moderation and Decision

The trivial decision scheme is saying that an image or video is inappropriate to watch if it contains "Porn". However, depending on the content moderation application, one might use more complex rules. Some examples: (a) Different populations might be allowed to watch images with deferent porn "severity". For example—filtering out both nudity and porn for children, while filtering out only "porn" for adults. (b) Different populations may have a totally different definition of a "non appropriate content". For example—for many people "non appropriate content" consist of only of Pornographic content, while for others it may consist of images showing body parts (shoulders, legs) or violence (c)_The decision may be based both on the classification results and on the web site for which the images were taken: e.g. —allowing to show a video suspicious as "porn" if it appears in a relatively safe web-site, such as news, or blocking it is it appears on YouTube (d) Applying different actions based on the probability of the image to be "porn", for example—allow watching it, if the probability is very low, deny watching if the probability is very high, and otherwise letting a human observer decide. (e) In some applications, the possible actions are not just to show or not to show an image, but rather applying other actions, for example—blocking only the problematic regions in the image or video, sending a warning message, or a notice (for example—notifying the parent that his children is viewing pornographic images).

Fast implementation using GPU

In order to obtain real-time performance, the inventors have implemented the system in both C++ and on GPU (Graphical Processing Unit). It is noted that other ways of implementations are available, as will be clear to a person who is of skill in the art. Apart from its usefulness in accelerating games & graphics, the techniques disclosed were discovered wherein GPUs was found to be very useful for high-performance image analysis. The main components that are the heaviest and needed to be accelerated are the image-features and the scoring stages).

Classifying videos: video can be classified frame by frame. Alternatively, the entire video can be classified according to visual or semantic tags extracted for the whole video. For example—saying that a video is pornographic if it consist of at least one (or a given percentage) of pornographic images. An HMM may be used to classify portions of the video while assuming continuity between frames (consecutive frames tend to belong to the same class). In addition, when classifying video content, more cues can be used: (a) Using movement detection as an ROI (b) Using space-time descriptors (descriptors that use pixels from multiple frames), such as motion descriptors.

Separation to Visual Classes and Sub-Classes

Intuitively, in order to detect porn images, one would classify each image as being part of one of two classes: "porn" and "non-porn". However, this approach looses a lot of information, as both the "porn" and "non-porn" classes can be separated to sub-classes, each with its own statistics. The "porn" class can be separated to sub-classes according to pose and/or gender; for example—a standing female, etc'. The "non-porn" class may be first separated to "person" and "non-person" classes, which have very different image statistics (Obviously, the "person" class has much higher confusion with the "porn" than the "non-person" class). The "person" class itself may be separated to sub-classes according to pose and gender. For each of the sub-classes we construct a DB of images (/videos) of that sub-classes, which is used to score the query.

For example, given a visual entity d, a score $s_i$ is computed for each sub-class i (out of a predetermined set of sub-classes), and all the scores of the sub-classes related a category (e.g. "porn") are combined, e.g.: $f_{\{porn\}}=f(s_1, \ldots, s_k)$. The combination function f can be, for example, a minimum of all the scores. Similarly, all the scores of sub-classes related to "non-porn" are combined, and the visual entity d is classified as "porn" if $f_{\{porn\}}<f_{\{non-porn\}}$.

Finding Region of Interest (ROI)

One of the major challenges in content moderation is that a relatively small portion of the visual data may in some situations significantly affect the desired moderation of the entire data. For example, a nude person that appears in the image may change its visual class to "Nudity" although the nude person captures a small part of the image. This poses a computer vision challenge of detecting objects inside a larger scene—as an exhaustive search over the entire raw data may not be practical.

The disclosed solutions may implement various techniques for overcoming this issue. For example, according to an embodiment of the invention, very fast algorithms may be used for finding ROI candidates, such as:

i. The whole image is usually selected as a ROI candidate.
ii. Homan body detector can be used to select ROI, or based on face detection.
iii. Skin color can be used to select ROI, by selecting large skin blobs (skin detection is shown in many papers discussing content filtering, e.g.
iv. For video, movement detection can be used to select ROI, by selecting large blocks that were moving (for example—these block may indicate a human body, or a moving part of the body)

It is noted that the visual classes will be computed for different portions of the input media. For example—tagging part of the image as "Adult Content", or segmenting a video to "Nudity" and "No Nudity" periods.

In order to reduce the computational time required, a set of Cascades may be implemented for the system or method. Each cascade extract the visual meta-data for some portion of the input raw-data (those for which the meta-data can easily be extracted) and passes the rest of the input data for further examination by other cascades. This mechanism enables to process "easy" inputs very fast (e.g., by using a partial set of the features, or using a sub-sampled version of the visual data), while spending more time on "ambiguous" images and videos. This idea is demonstrated in FIG. 18, when the raw data may include images and the visual class is "Nudity".

Figure 18:
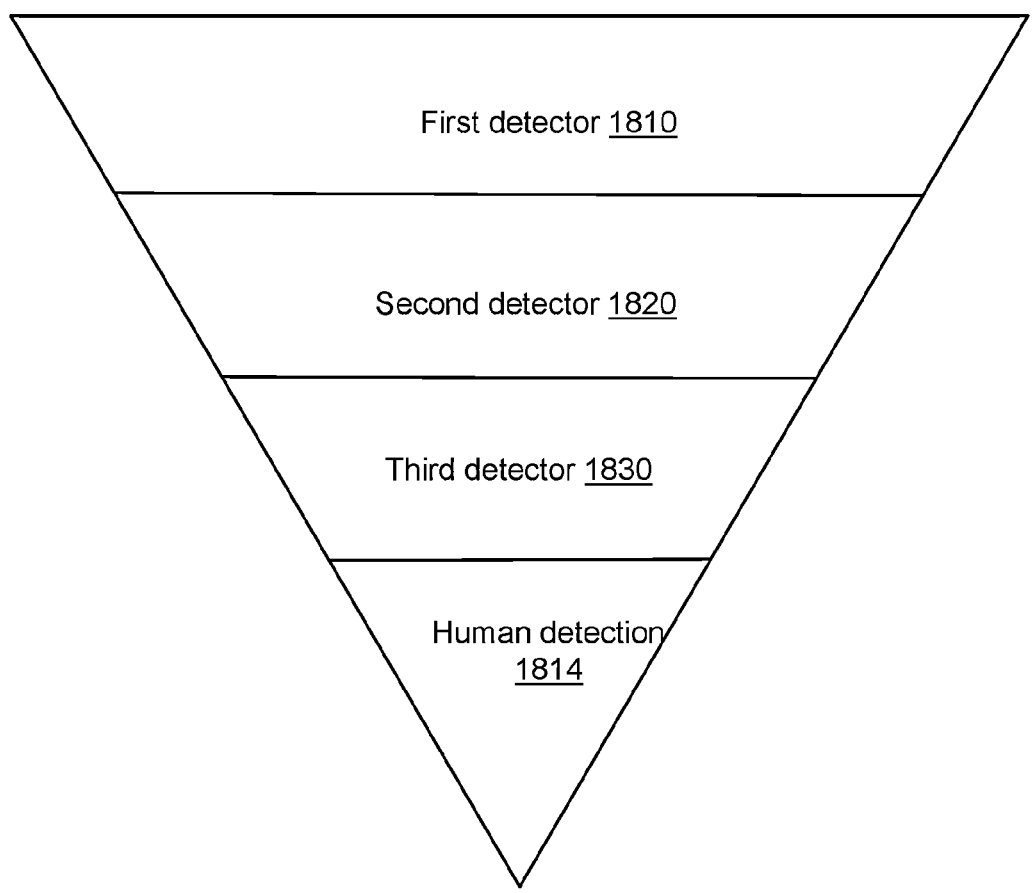
FIG. 18 illustrates a cascaded process according to an embodiment of the invention.

FIG. 18 illustrates a cascaded process 1800, according to an embodiment of the invention.

The cascaded process may be used in various embodiments of the invention to reduce the computational time. The cascaded process includes multiple iteration of stages (filters) 1810-1840, each stage may differ from each other by the level of computational resources it may consume, by its speed, by its granularity and the like. An outcome of one iteration can be fed to another iteration. For example, when searching for media object entities of a certain class, one iteration can be used for performing a gross filtering operation (may be quicker, run on lower resolution image entities, use less media class descriptors and the like). Those media entities that pass the iteration are sent to another iteration that may apply a finer filtering process, and may utilize more computational resources.

The first stage (first detector) 1810 can run on all images, return a probability (of belonging to a certain class or classes), if that probability is above a first threshold the image is sent to the next stage—else it is filtered out. It can run on media elements and perform the filtering out on a media element basis.

The second stage (second detector) 1820 can operate on images that passed the first stage 1810. It can allocate more resources than the first stage 1810. It may apply different calculations or the same calculation with different probability thresholds to filter out. It can run on media elements and perform the filtering out on a media element basis.

The third stage (second detector) 1830 can operate on images that passed the second stage 1820. It can allocate more resources than the first stage 1810. It may apply different calculations or the same calculation with different probability thresholds to filter out. It can run on media elements and perform the filtering out on a media element basis.

There can be any number of stages. The last stage can be sent for human classification (stage 1840) but this is not necessarily so and the process can be fully automated.

Figure 19:
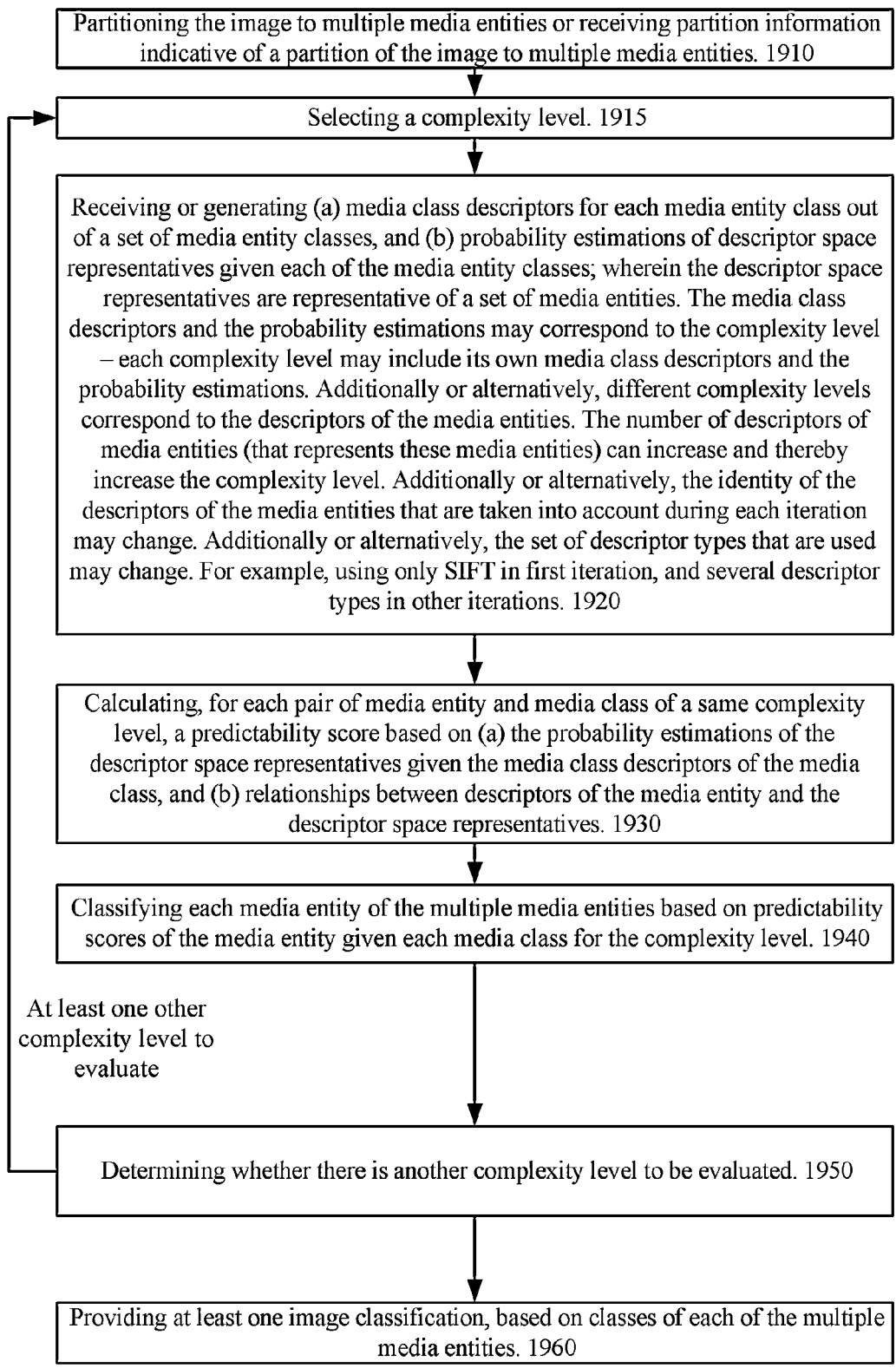
FIG. 19 illustrates a method according to an embodiment of the invention.

FIG. 19 illustrates method 1900 according to an embodiment of the invention.

Method 1900 may start by stage 1910 of partitioning the image to multiple media entities or receiving partition information indicative of a partition of the image to multiple media entities.

Stage 1910 may be followed by multiple iterations of stages 1915, 1920, 1930, 1940 and 1945.

Stage 1915 includes selecting a complexity level. A complexity level may represent the time required for completing the iteration, amount of computational resources required to complete the iteration and the like. It is assumed that the lowest complexity is elected first and that the complexity increases with the number of iterations.

Stage 1915 is followed by stage 1920 of receiving or generating (a) media class descriptors for each media entity class out of a set of media entity classes, and (b) probability estimations of descriptor space representatives given each of the media entity classes; wherein the descriptor space representatives are representative of a set of media entities. The media class descriptors and the probability estimations may correspond to the complexity level—each complexity level may include its own media class descriptors and the probability estimations. Additionally or alternatively, different complexity levels correspond to the descriptors of the media entities. The number of descriptors of media entities (that represents these media entities) can increase and thereby increase the complexity level. Additionally or alternatively, the identity of the descriptors of the media entities that are taken into account during each iteration may change. Additionally or alternatively, the set of descriptor types that are used may change. For example, using only SIFT in first iteration, and several descriptor types in other iterations.

Stage 1920 may be followed by stage 1930 of calculating, for each pair of media entity and media class of a same complexity level, a predictability score based on (a) the probability estimations of the descriptor space representatives given the media class descriptors of the media class, and (b) relationships between descriptors of the media entity and the descriptor space representatives.

Stage 1930 may be followed by stage 1940 of classifying each media entity of the multiple media entities based on predictability scores of the media entity given each media class for the complexity level.

Different complexity levels may differ from each other by an amount of media class descriptors, and additionally or alternatively, an amount of descriptors of the media entity.

Different complexity levels may differ from each other by a resolution of media entities.

Stage 1940 is followed by stage 1950 of determining whether there is another complexity level to be determined. If the answer is positive then stage 1950 is followed by stage 1915 during which a new complexity level is selected. Stage 1915 may include filtering out irrelevant media entities— those who do not belong, according to the current classification to one or more predefined classes.

If the answer is negative (no more complexity levels to examine) then stage 1950 may be followed by stage 1960 of providing at least one image classification, based on classes of each of the multiple media entities.

According to an embodiment of the invention method 1900 may include filtering out by each iteration at least zero media entity—wherein a filtered out media entity is not provided as input to a next iteration. The filtering out includes determining that zero or more media entities do not belong to a certain class of interest and not providing that filtered out media entity to the next iteration.

It is noted that during one or more iterations the method can partition the image to multiple image entities.

Figure 20:
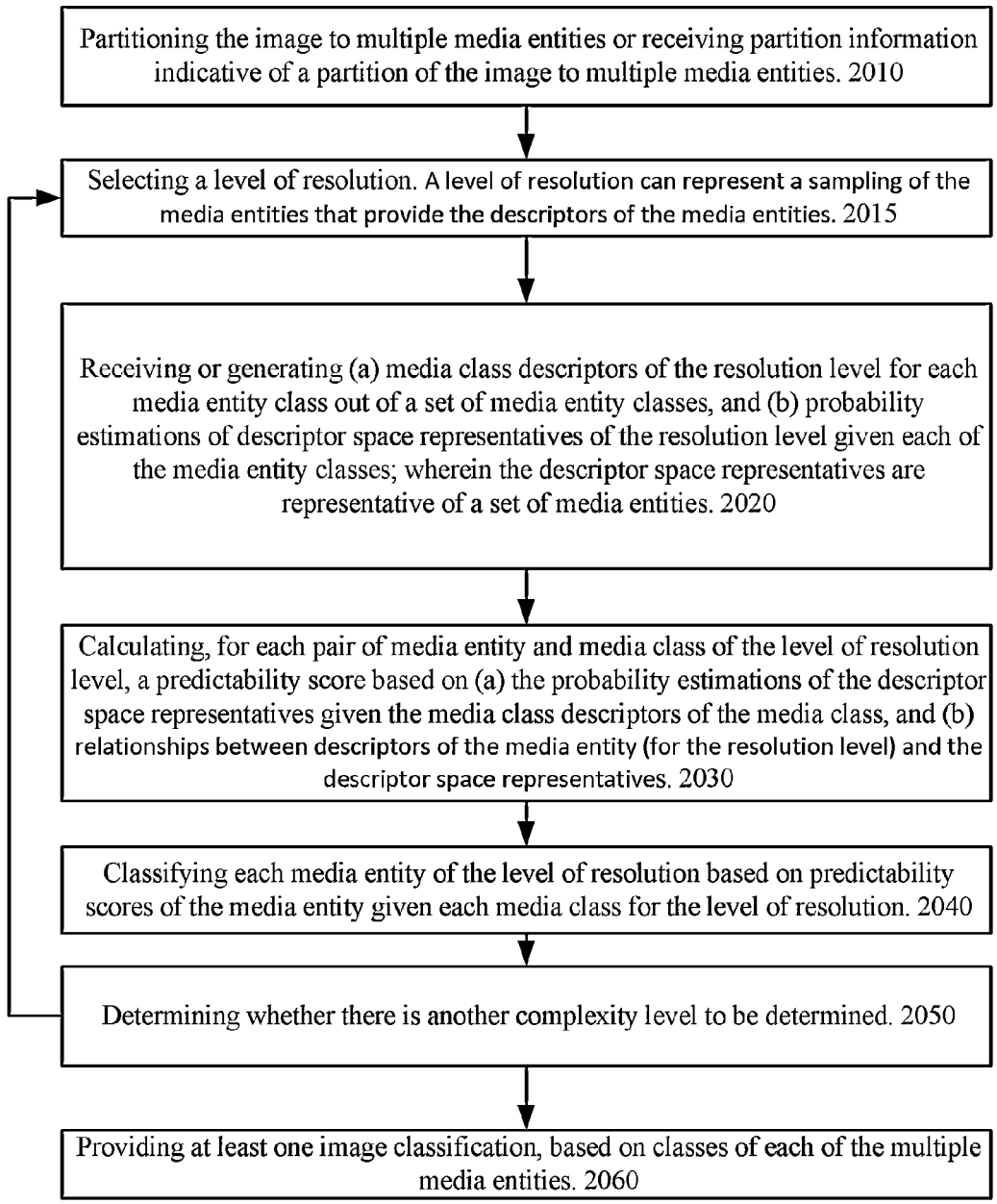
FIG. 20 illustrates a method according to an embodiment of the invention.

FIG. 20 illustrates method 2000 according to an embodiment of the invention.

Method 2000 may start by stage 2010 of partitioning the image to multiple media entities or receiving partition information indicative of a partition of the image to multiple media entities.

Stage 2010 may be followed by multiple iterations of stages 2015, 2020, 2030, 2040 and 2045.

Stage 2015 includes selecting a level of resolution. A level of resolution can represent a sampling of the media entities that provide the descriptors of the media entities. It is assumed that the lowest resolution is elected first and that the level of resolution increases with the number of iterations. Different levels of resolution may represent different numbers of descriptors that are used to represent the media entities.

Stage 2015 is followed by stage 2020 of receiving or generating (a) media class descriptors for each media entity class out of a set of media entity classes, and (b) probability estimations of descriptor space representatives given each of the media entity classes; wherein descriptor space representatives are representative of a set of media entities.

Stage 2020 is followed by stage 2030 of calculating, for each pair of media entity and media class of the level of resolution level, a predictability score based on (a) the probability estimations of the descriptor space representatives given the media class descriptors of the media class of the resolution level, and (b) relationships between descriptors of the media entity (for the resolution level) and the descriptor space representatives.

Stage 2030 is followed by stage 2040 of classifying each media entity of the level of resolution based on predictability scores of the media entity given each media class for the level of resolution.

Stage 2040 is followed by stage 2050 of determining whether there is another complexity level to be determined. If the answer is positive then stage 2050 is followed by stage 2015 during which a new complexity level is selected. Stage 2015 may include filtering out irrelevant media entities— those who do not belong, according to the current classification to one or more predefined classes.

If the answer is negative (no more complexity levels to examine) then stage 2050 may be followed by stage 2060 of providing at least one image classification, based on classes of each of the multiple media entities.

According to an embodiment of the invention method 2000 may include filtering out by each iteration at least zero media entity—wherein a filtered out media entity is not provided as input to a next iteration. The filtering out includes determining that zero or more media entities do not belong to a certain class of interest and not providing that filtered out media entity to the next iteration.

It is noted that during one or more iterations the method can partition the image to multiple image entities.

Figure 21:
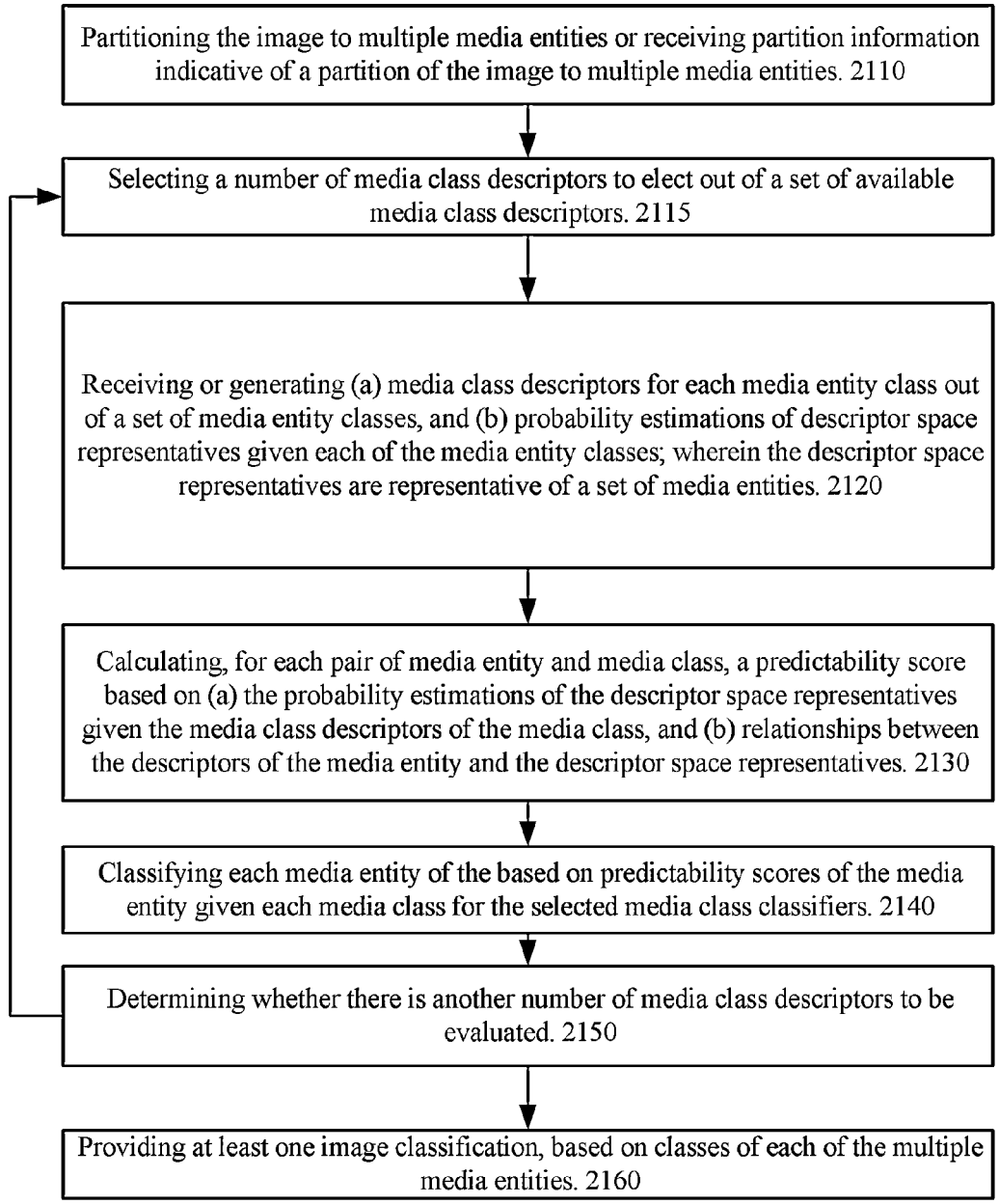
FIG. 21 illustrates a method according to an embodiment of the invention.

FIG. 21 illustrates method 2100 according to an embodiment of the invention.

Method 2100 may start by stage 2110 of partitioning the image to multiple media entities or receiving partition information indicative of a partition of the image to multiple media entities.

Stage 2110 may be followed by multiple iterations of stages 2115, 2120, 2130, 2140 and 2145.

Stage 2115 includes selecting a number of media entity class descriptors to select out of available media entity media class descriptors. It is assumed that the number of selected media entity increases with the number of iterations. It is noted that sets of media entity descriptors that differ from each other (not necessarily by number but by the identity of selected media descriptors) can be elected.

Stage 2115 is followed by stage 2120 of receiving or generating (a) media class descriptors for each media entity class out of a set of media entity classes, and (b) probability estimations of descriptor space representatives given each of the media entity classes; wherein the descriptor space representatives are representative of a set of media entities.

Stage 2120 is followed by stage 2130 of calculating, for each pair of media entity and media class, a predictability score based on (a) the probability estimations of the descriptor space representatives given the media class descriptors of the media class, and (b) relationships between the descriptors of the media entity and the descriptor space representatives.

Stage 2130 is followed by stage 2140 of classifying each media entity of the based on predictability scores of the media entity given each media class for the selected media class descriptors.

Stage 2140 is followed by stage 2150 of determining whether there is another number of media entity descriptors to be determined. If the answer is positive then stage 2150 is followed by stage 2115 during which a new number of media class descriptors is selected. Stage 2115 may include filtering out irrelevant media entities—those who do not belong, according to the current classification to one or more predefined classes.

If the answer is negative (no more classifiers to examine) then stage 2150 may be followed by stage 2160 of providing at least one image classification, based on classes of each of the multiple media entities.

According to an embodiment of the invention method 2100 may include filtering out by each iteration at least zero media entity—wherein a filtered out media entity is not provided as input to a next iteration. The filtering out includes determining that zero or more media entities do not belong to a certain class of interest and not providing that filtered out media entity to the next iteration.

It is noted that during one or more iterations the method can partition the image to multiple image entities.

EXAMPLE

In this sub-section we take a simple example, and describe an implementation the entire flow based on this example.

Assume that we get as an input the image bellow 22A. The visual analysis stage is described in sub-FIGS. 22B-22E. First, image attributes are extracted from am image 2201 that include a house 2202 and a person 2203 that stands outside the house. In this simple example, we compute two image attributes:

i. Image gradients (used later by the SIFT descriptor)
  ii. ROI (region-of-interest) extracted using a face/person detector. The ROI is marked with grid 2204 in FIG. 22B. The grid includes grid elements such as four elements 2205.

Figure 22A:
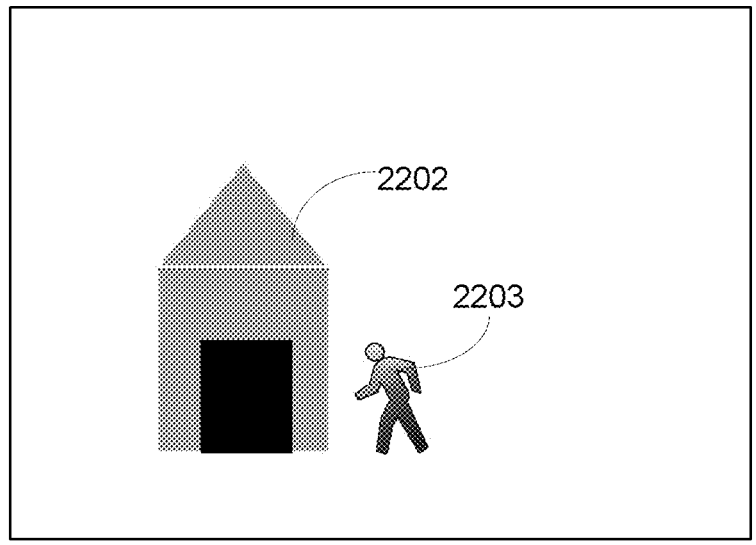
FIGS. 22A-22F illustrate an example of an image and various outcomes of various processing stages according to an embodiment of the invention.
Figure 22B:
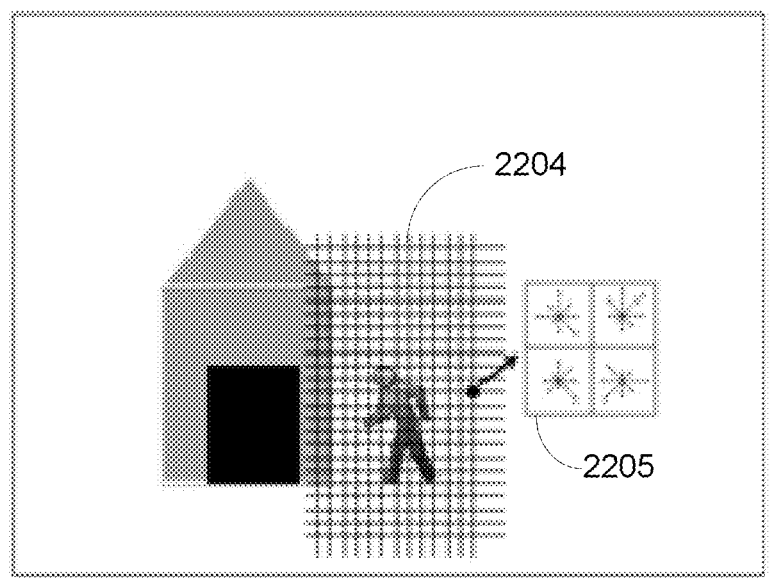
Figure 22C:
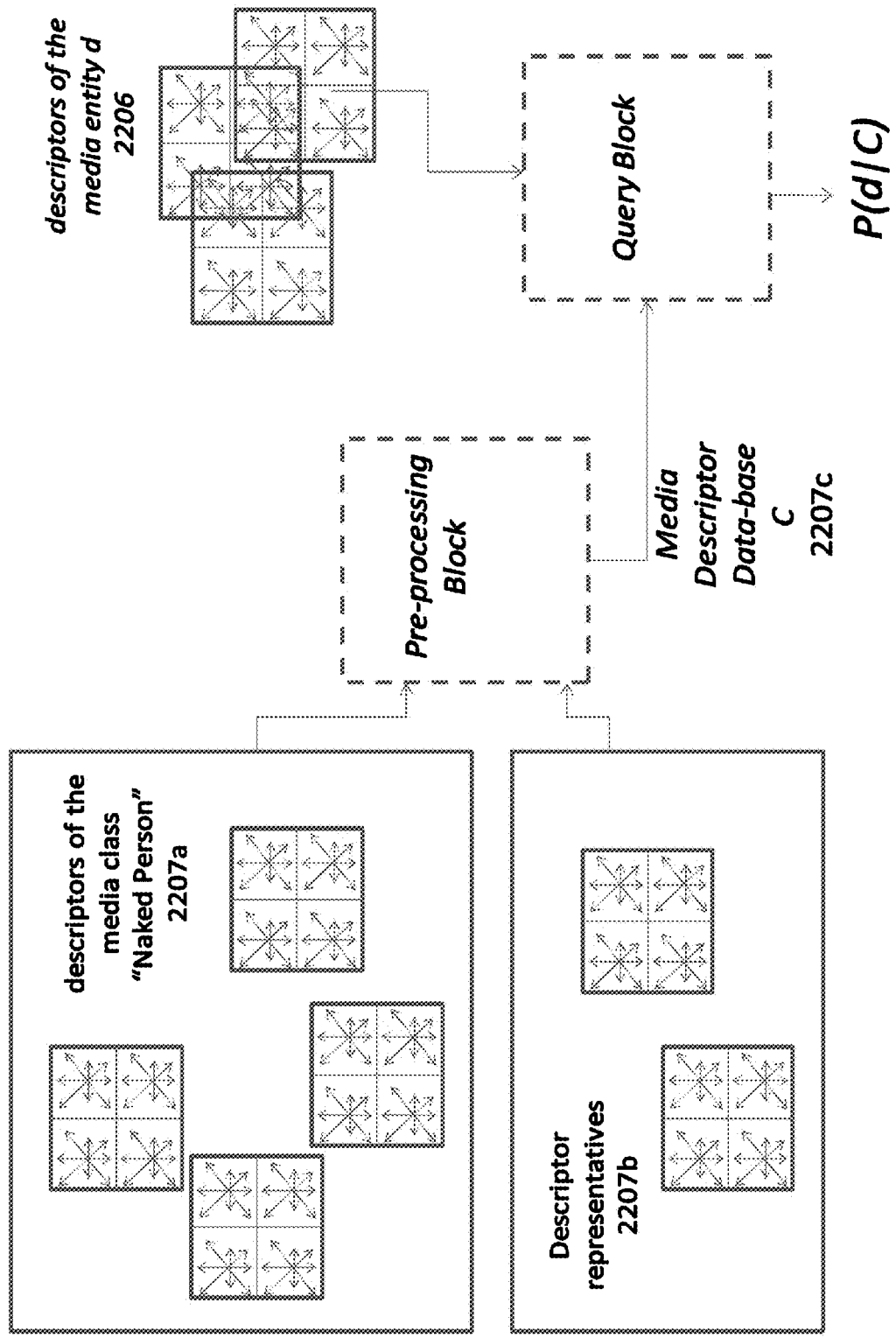

Next, image features are computed on some set of sample points (in the example shown in 22B—a descriptor, e.g. SIFT, is computed on a dense grid inside the ROI. Using the set of features (SIFT) extracted from the image, a likelihood score is computed for every sample point indicating the probability of that sample point to belong to the various classes (e.g., the class: "Naked Person"). This likelihood is computed by comparing each image feature (e.g. SIFT descriptor 2206) with a given DB of features corresponding to this class and measuring its density within this class. FIG. 22C illustrates: (a) descriptors of a media class names "naked person" 2207a and (b) descriptor space representatives (denoted "descriptor representatives) 2207b, that are fed to a pre-processing block to provide (c) media descriptors database 2207c. The media descriptors database 2207 and (d) descriptors of the media entity (image 2201 of image portion within grid 2204) 2206, are fed to a query block that calculates the predictability score.

Figure 22D:
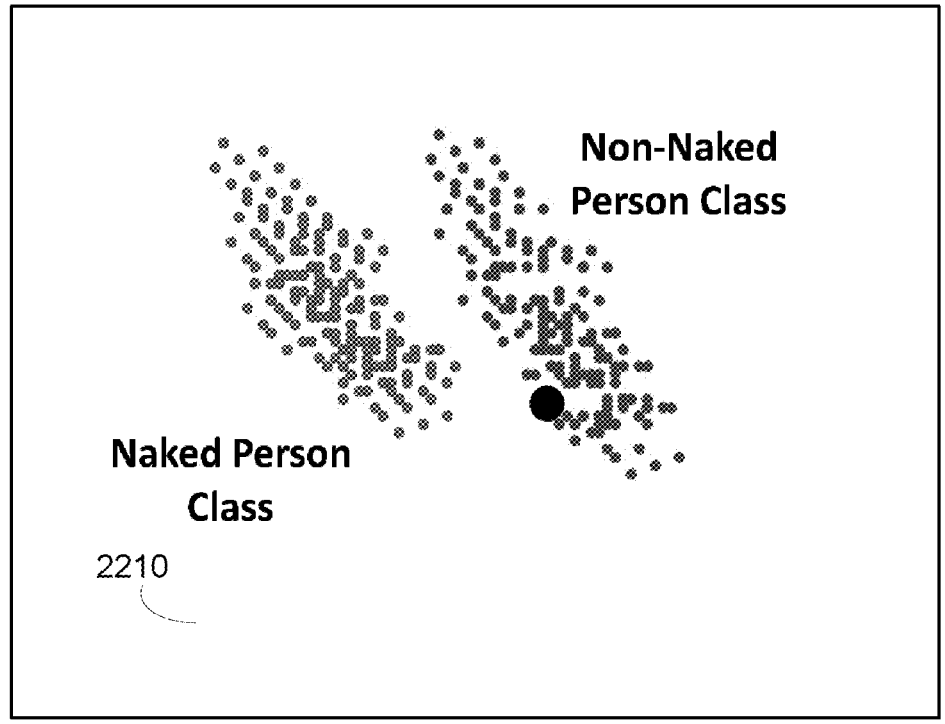
Figure 22E:
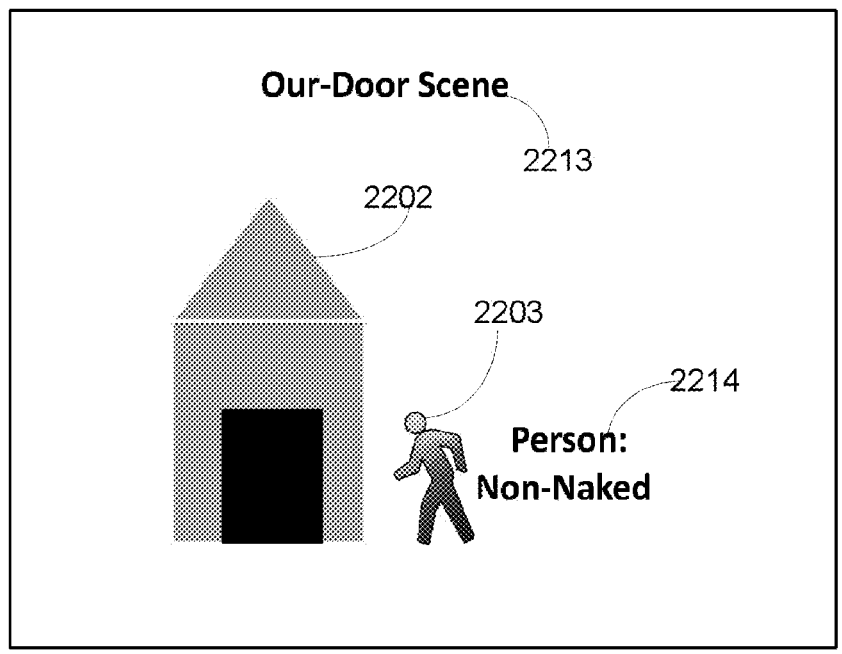
Figure 22F:
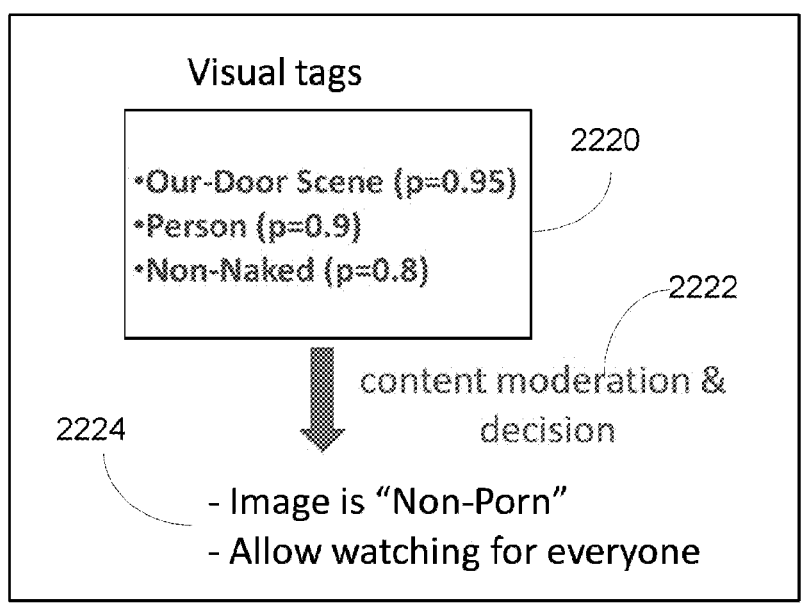

Schematically, for a hypothetic 2D feature, the density estimation will look like FIG. 22D. In this sub-figure, it can be seen that the 2D feature indicated by the dot is more likely to belong to the "Non-Naked Person" class (of points 2211) than to the "Naked Person" class of points 2210. The likelihoods from all the image features (descriptors) and from all the classes is combined, proving a probability of the query region to belong to each of the classes As shown in FIGS. 22E and 22F, the result is a meta-data consisting of the visual tags 2213 and 2214. The tagging can be probabilistic ("soft")—as illustrated by box 2220, indicating for example that [p(is person)=0.9], [p(person is naked)=0.8] and [p(outdoor-scene)=0.95] (note that the classes can sometimes overlap). Finally, the meta-data (visual tags) is passed to a content moderation & decision blocks (2222) which use the visual tags to make a decision 2224 (in this example—Image is suitable for all type of users, as shown in FIG. 22F.

The above techniques may be implemented by various systems, according to various embodiments of the invention. A first mode of operation, also referred to as "Server" mode (See FIG. 23), in which there is only servers (cache server 2310 having a cache database 2312 and visual analysis servers 2322 collectively denoted 2320) that include all the components, including the visual analysis component. A second mode of operation is a "Client-Server" mode, in which there are both a server and a Client (See FIGS. 23 and 24). The Client does not have the visual analysis component (Therefore, to Client extract the visual tags by accessing the Server), but does include a decision component, which can be adjusted to a specific user credentials. A final mode of operation is a "Thin Client Mode" (FIG. 25) in which the client is even thinner—given a URL it access the server for an action such as "blocking an image", etc. (It might also use a local cache).

Server Mode

Figure 23:
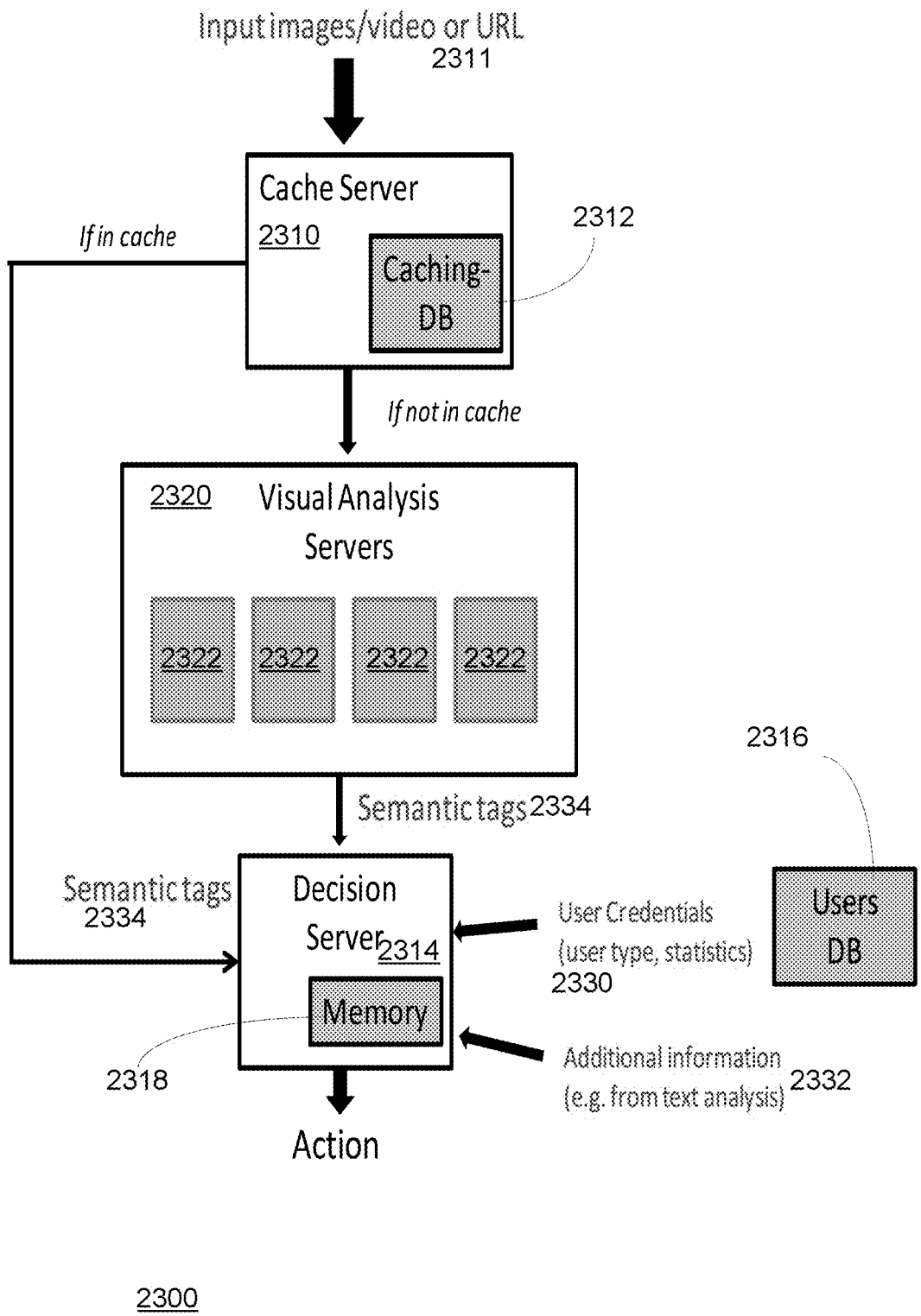
FIGS. 23-25 illustrate various systems according to various embodiments of the invention.

The server system, according to an embodiment of the invention, is described in FIG. 23. The input to the cache server 2312 and to the visual analysis servers 2320 is a bulk of visual raw data (e.g.—a set of images, or a video steam) or a URL. The visual raw data is first passed throw a caching mechanism (2310), to avoid un-necessary computations for a visual content that has already been processes. If the visual data is not found in the caching data base 2312, it is passed through the "Visual Analysis" servers 2320 that extract Semantic Tags 2334 from the visual data. The details of the "Visual Analysis" component are described in previous sections. Optionally, the visual analysis servers 2320 may also get some information about the user. For example—the speed and quality of the processing may differ between users (users for which real-time processing is needed, premium users, etc'. User statistics can also be used as priors for the visual analysis stage).

In either way (using cache, or using the visual analysis component), a set of semantic tags 2334 that correspond to the input visual data are extracted. The semantic tags, together with user credentials 2330, are being used as an input to the decision server 2314. The user credentials help the decision server 2314 to adjust the decision to a specific user. The decision server runs the content moderation stage, in which the suitability of the input raw data to various destination populations is determined. The decision server may use a memory component in cases where earlier decisions are relevant. For example—in the case of input video stream, where the semantic tags and the decisions can be influenced by earlier chunks in the same video.

The output of the decision server 2314 is an action decision, for example—blocking an image or sending a warning. In addition to the semantic tags, the decision server can use other sources of information: either user credentials (user type & settings, user statistics, etc') or environmental sources of information, such as semantic tags extracted from textual analysis, or information related to the URL.

Client-Server Mode

Figure 24:
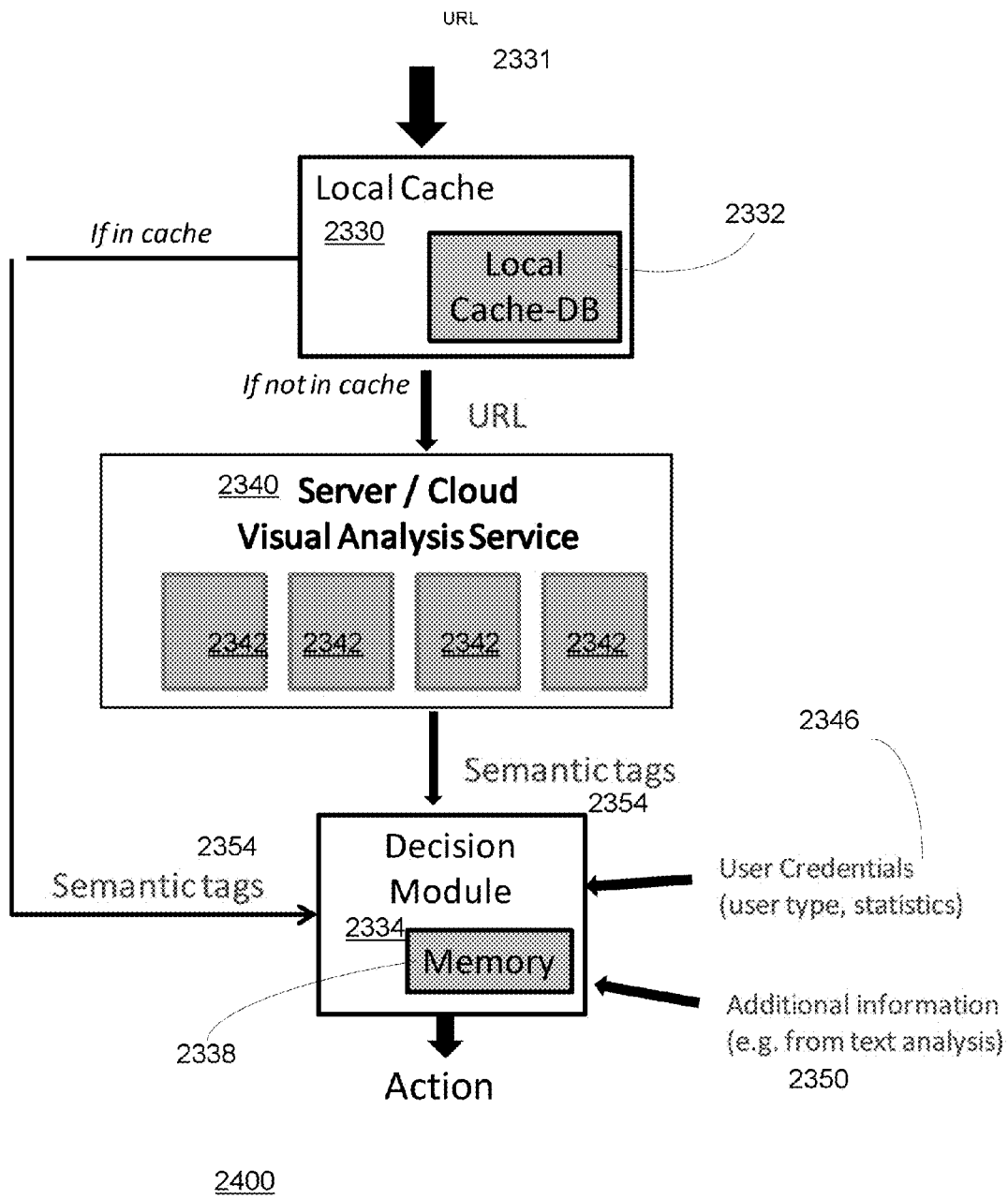
Figure 25:
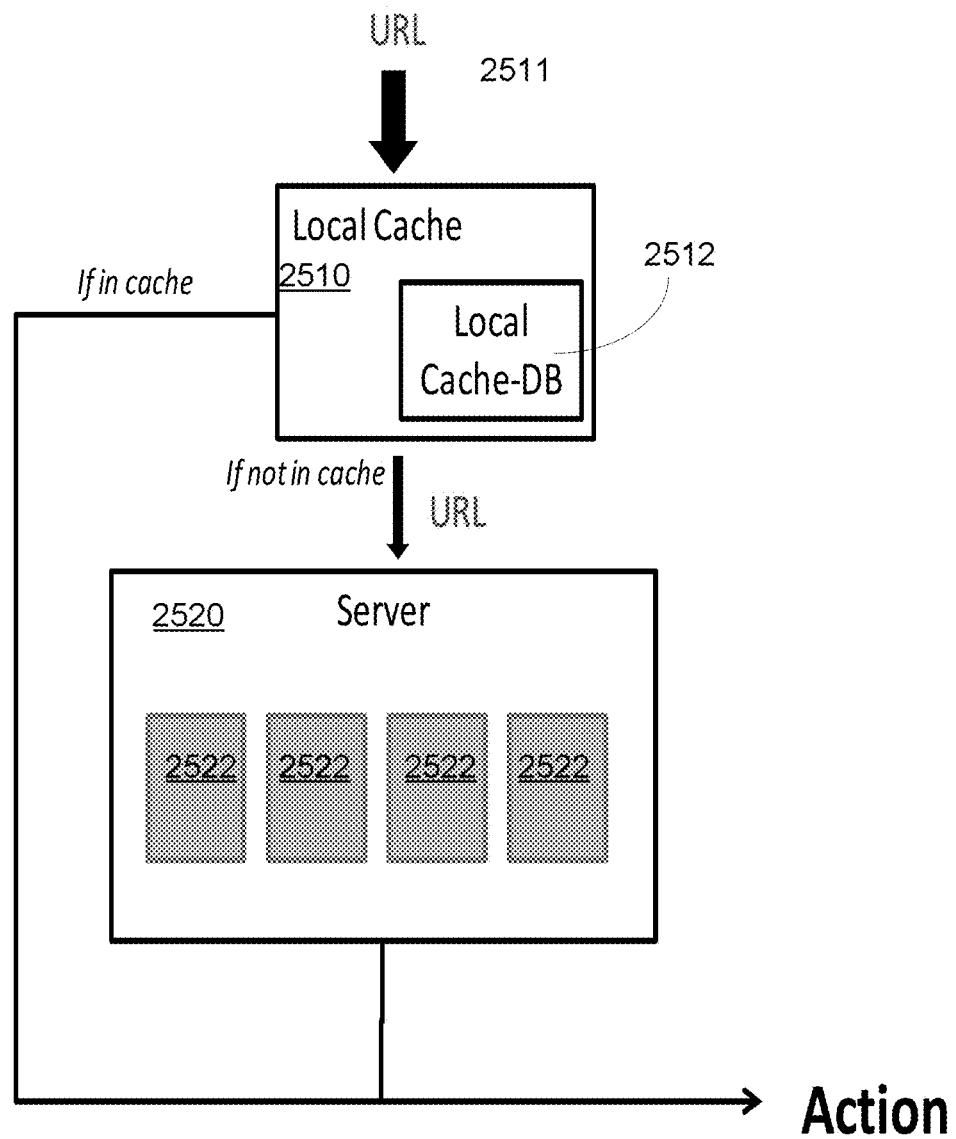

A regular client is similar to the Server, in the exception that it doesn't include the visual analysis component. Instead, the URL is send to a service (such as server/cloud visual analysis service) 2340 that does the visual analysis and returns back the Semantic Tags 2354. In a regular client, there can be an internal component 2334 that does the decision itself according to the output of the visual server. This component 2334 can include the internal settings of the client (for example—degree of restriction) and additional information that may help to make the decision. The local cache of the client can help reducing the frequency in which the client has to access the visual analysis service. URLs that are access repeatedly can be handled internally. This mode is described in FIG. 24. FIG. 24 provides a schematic diagram of the Client system. It includes the decision module, but the visual analysis is done by accessing an external Server. See body of text for further details "Thin Client" Mode A thin client has even less components—given a URL, it simply access the server 2512 or a local cache 2510 (that has a local cache data base 2512) with the URL, and returns with a decision. A local cache can be used by a thin client too, in order to reduce the frequency of server-access. This mode is described in FIG. 25.

Section 7: Applications/Client types

This section describes different type of clients that might use the proposed system. For each type of client the system may be implemented using each one of the various modes of operation, as described in the previous section (Server, Client-Server and Thin-Server Modes).

Internet TCP/IP Network Provider/Operator

The proposed system can be used by internet providers to moderate their content with respect to their clients. For example—enabling internet providers to suggest a "porn-free" surfing experience, or moderating the supplied internet content with respect to the user (e.g.—limited access for kids, etc'). These internet users include both users of private computers, cellular users or via TV (for example, with Google TV).

Enterprise

The proposed system can be used by enterprises to filter their visual content.

Education

The proposed system can be used by educational facilities (such as schools) to filter the visual content that can be reached by the students/pupils.

User Generated Content (UGC)

The proposed system can be used to do content moderation for User Generated Content (UGC) sites such as YouTube, Face-book, Flickr, etc'. In such sites, traditional solutions of text analysis are insufficient. In many cases, the visual information is not accompanied with any textual information. In other cases, misleading textual information is inserted deliberately. This renders textual analysis and domain filtering useless against these threats. Other methods such as crowd sourcing and collaborative filtering are inefficient for the long tail of visual information in user generated content.

Consumer Client

The proposed system can be used by end-users using a downloadable client filtering software on any personal computer (desktop, Laptop, Smartphone etc.). Lately, the TV can also be used for browsing in the web (e.g., using Google-TV) and may also be addressed as a personal computer.

Media Stocks

The proposed system can be used to do content moderation in media stocks (such as Google, Yahoo!, iStockPhoto, Getty Images, PhotoBucket, etc').

Figure 26:
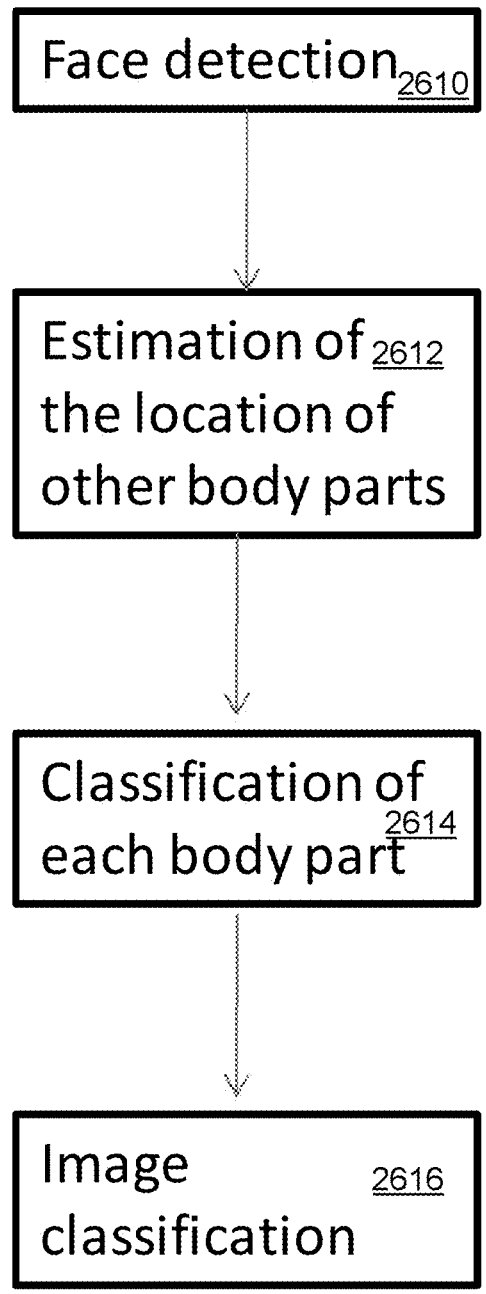
FIGS. 26-27 illustrate a detection of body organs based on detection of another body organ.
Figure 27:
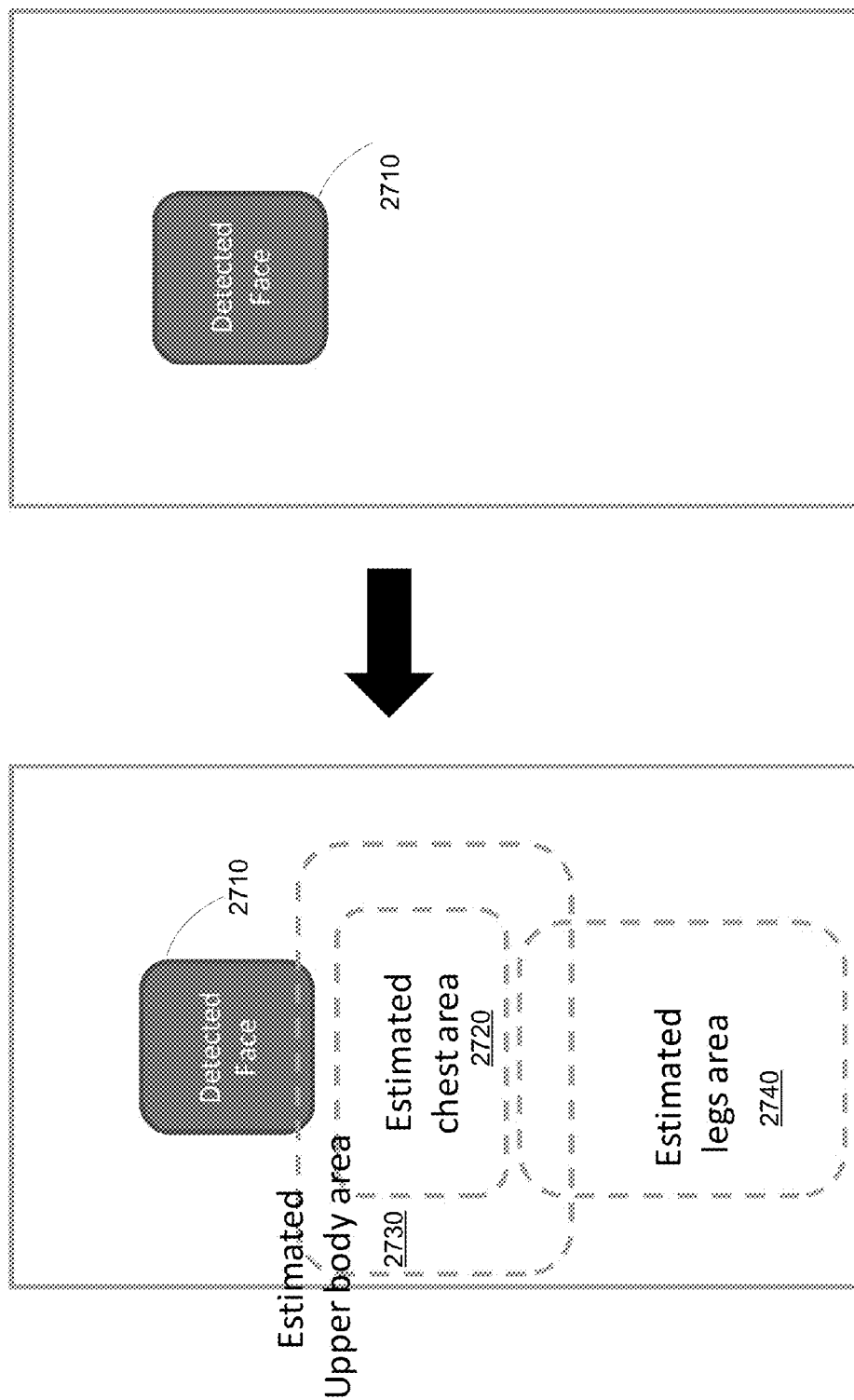

FIGS. 26 and 27 illustrate a detection of a body organ that is followed by a detection of other body organs. In these figures a face is detected (box 2610 of FIG. 26 and box 2710 of FIG. 27) and then the other body organs are detected (within an estimated upper body area 2730, within an estimated chest area 2720 and within an estimated legs area 2740) based on a location of the face (box 2612 of FIG. 26). It is noted that the first detected body organ can differ from the face of the person. The estimates areas of the other body organs can be analyzed to detect these other body organs (such as by classification of each body part—2614) and this may lead to a classification of the entire image.

The above disclosed systems and methods may also be implemented as a computer program product, that include non-transitory computer readable medium having a computer readable medium embodied therein, wherein the computer readable medium includes instructions for the carrying out of the above stages.

It is noted that the above disclosed methods and systems may be implemented in various implementations, embodiments, and fields of art, few examples of which were offered above.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Either one of the mentioned above methods can be executed by a computer program product that includes a non-transitory computer readable medium.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for classifying at least one image, the method comprises:

partitioning the at least one image to multiple media entities or receiving a partition information indicative of a partition of the at least one image to multiple media entities;

receiving or generating (a) media class descriptors for each media entity class out of a set of media entity classes, and (b) probability estimations of descriptor space representatives given each of the media entity classes; wherein the descriptor space representatives are representative of a set of media entities;

calculating, for each pair of media entity and media class, a predictability score based on (a) the probability estimations of the descriptor space representatives given the media class descriptors of the media class, and (b) relationships between descriptors of the media entity and the descriptor space representatives;

classifying each media entity of the multiple media entities based on predictability scores of the media entity given each media class; and providing at least one image classification, based on classes of each of the multiple media entities.

2. The method according to claim 1 wherein the at least one image comprises multiple images and wherein the classifying comprising classifying each image.

3. The method according to claim 1 wherein the at least one image forms a video stream.

4. The method according to claim 1, wherein the at least one image is a single image.

5. The method according to claim 1, comprising applying a human body detection algorithm on the at least one image to provide human body detection results; and partitioning the at least one image based on the human body detection results.

6. The method according to claim 1, comprising applying a face detection algorithm on the at least one image to provide face detection results; and partitioning the at least one image based on the face detection results.

7. The method according to claim 1, comprising applying a human skin detection algorithm on the at least one image to provide human skin detection results; and partitioning the at least one image based on the human skin detection results.

8. The method according to claim 1, comprising determining whether the at least one image should be prevented from being displayed.

9. The method according to claim 1, comprising defining a dominant class and classifying an image out of the at least one image as belonging to the dominant class if at least one media entity of the image is classified as belonging to the dominant class.

10. The method according to claim 1, comprising executing multiple iterations of a sequence of stages that comprises the stages of receiving or generating, calculating, and classifying; wherein different iterations differ from each other by accuracy of execution and speed of execution.

11. The method according to claim 10, wherein the decision of whether to apply each iteration is based on the output of previous iterations.

12. The method according to claim 10, comprising filtering out an image based on an outcome of at least one iteration of the multiple iterations.

13. The method according to claim 1 comprising:
detecting a human organ;
determining, based on a location of the human organ, an expected location of at least one other human organ; and
verifying the expected location of the at least one other human organ by processing at least one portion of an image that corresponds to the expected location of the at least one other human organ.

14. The method according to claim 1, comprising executing multiple iterations of a sequence of stages that comprises the stages of receiving or generating, calculating, and classifying; wherein different iterations differ from each other by a complexity level.

15. The method according to claim 14, wherein at least two iterations further comprise partitioning the at least one image.

16. The method according to claim 14, comprising performing multiple iterations, each iteration associated with a higher complexity level.

17. The method according to claim 14, wherein the decision of whether to apply each iteration is based on the output of previous iterations.

18. The method according to claim 1, comprising executing multiple iterations of a sequence of stages that comprises the stages of receiving or generating, calculating, and classifying; wherein different iterations differ from each other by a number of descriptors of the media entities.

19. The method according to claim 17, wherein at least two iterations further comprise partitioning the at least one image.

20. The method according to claim 10, comprising performing multiple iterations while increasing the number of descriptors of the media entities.

21. The method according to claim 1, comprising executing multiple iterations of a sequence of stages that comprises the stages of receiving or generating, calculating, and classifying; wherein different iterations differ from each other by a selection of media class descriptors that are taken into account during the iteration.

22. The method according to claim 18, wherein at least two iterations further comprise partitioning the at least one image.

23. The method according to claim 1, comprising executing multiple iterations of a sequence of stages that comprises the stages of receiving or generating, calculating, and classifying; wherein different iterations differ from each other by descriptors of the media entity that are taken into account during the iteration.

24. The method according to claim 23, wherein at least two iterations further comprise partitioning the at least one image.

25. The method according to claim 1, comprising applying a motion detection algorithm on the at least one image to provide motion detection results; and partitioning the at least one image based on the motion detection results.

26. A computer program product that comprises a non-transitory computer readable medium that stores instructions for:
partitioning the at least one image to multiple media entities or receiving a partition information indicative of a partition of the at least one image to multiple media entities;
receiving or generating (a) media class descriptors for each media entity class out of a set of media entity classes, and (b) probability estimations of descriptor space representatives given each of the media entity classes; wherein the descriptor space representatives are representative of a set of media entities;
calculating, for each pair of media entity and media class, a predictability score based on (a) the probability estimations of the descriptor space representatives given the media class descriptors of the media class, and (b) relationships between descriptors of the media entity and the descriptor space representatives;
classifying each media entity of the multiple media entities based on predictability scores of the media entity given each media class; and
providing at least one image classification, based on classes of each of the multiple media entities.

* * * * *